United States Patent
Giloh

(10) Patent No.: US 10,142,906 B2
(45) Date of Patent: Nov. 27, 2018

(54) CELLULAR COMMUNICATION SYSTEM WITH MOVING BASE STATIONS AND METHODS AND APPARATUS USEFUL IN CONJUNCTION THEREWITH

(71) Applicant: ELTA SYSTEMS LTD., Ashdod (IL)

(72) Inventor: Benjamin Giloh, Moshav Yaad (IL)

(73) Assignee: ELTA SYSTEMS LTD., Ashdod (IL)

( * ) Notice: Subject to any disclaimer, the term of this patent is extended or adjusted under 35 U.S.C. 154(b) by 195 days.

(21) Appl. No.: 14/604,079

(22) Filed: Jan. 23, 2015

(65) Prior Publication Data

US 2015/0237556 A1 Aug. 20, 2015

Related U.S. Application Data

(62) Division of application No. 13/575,795, filed as application No. PCT/IL2011/000096 on Jan. 27, 2011.

(30) Foreign Application Priority Data

Jan. 28, 2010 (IL) .......................................... 203568
Jun. 17, 2010 (IL) .......................................... 206455

(51) Int. Cl.
*H04W 36/30* (2009.01)
*H04W 4/021* (2018.01)
(Continued)

(52) U.S. Cl.
CPC ........ *H04W 36/30* (2013.01); *H04B 7/15507* (2013.01); *H04W 4/022* (2013.01);
(Continued)

(58) Field of Classification Search
CPC ... H04W 84/047; H04W 88/04; H04W 16/26; H04W 8/005; H04W 84/005;
(Continued)

(56) References Cited

U.S. PATENT DOCUMENTS 4,236,158 A 11/1980 Daniel
5,357,257 A 10/1994 Nevin
(Continued)

FOREIGN PATENT DOCUMENTS

CN 101523818 A 9/2009
EP 0615391 A1 9/1994
(Continued)

OTHER PUBLICATIONS

Wikipedia "Encapsulation (networking)," accessed 2015, available from http://en.wikipedia.org/wiki/Encapsulation_(networking).
(Continued)

*Primary Examiner* — Jaime Holliday
(74) *Attorney, Agent, or Firm* — Oliff PLC

(57) ABSTRACT

A mobile communication network system operative in conjunction with a core network including a core device and at least one static base station includes a plurality of base stations. The system further includes a population of mobile stations communicating via antennae with the base stations. The base stations include at least one moving base station which communicates via antennae with the mobile stations and includes base station functionality and a first radio manager and mobile station functionality all co-located with the base station functionality. The base station functionality has a physical back-connection to the first radio manager. The first radio manager has a physical connection with the mobile station functionality. The mobile station functionality communicates via antennae with at least one selectable static base station. The information used to determine whether to reject includes the location of the moving base station and statistics regarding measurements of link quality.

54 Claims, 14 Drawing Sheets

(51) Int. Cl.
*H04W 48/20* (2009.01)
*H04B 7/155* (2006.01)
*H04W 72/08* (2009.01)
*H04W 84/00* (2009.01)
*H04W 16/26* (2009.01)
*H04W 84/12* (2009.01)
*H04W 84/18* (2009.01)
*H04W 88/04* (2009.01)
*H04W 8/00* (2009.01)
*H04W 88/02* (2009.01)
*H04W 88/06* (2009.01)
*H04W 84/04* (2009.01)
*H04W 88/08* (2009.01)

(52) U.S. Cl.
CPC ......... *H04W 48/20* (2013.01); *H04W 72/085* (2013.01); *H04W 8/005* (2013.01); *H04W 16/26* (2013.01); *H04W 84/005* (2013.01); *H04W 84/047* (2013.01); *H04W 84/12* (2013.01); *H04W 84/18* (2013.01); *H04W 88/02* (2013.01); *H04W 88/04* (2013.01); *H04W 88/06* (2013.01); *H04W 88/08* (2013.01)

(58) Field of Classification Search
CPC ..... H04W 88/02; H04W 88/08; H04W 84/18; H04W 88/06; H04W 84/12
See application file for complete search history.

(56) References Cited

U.S. PATENT DOCUMENTS

| | | | |
|---|---|---|---|
| 5,363,111 | A | 11/1994 | Murphy |
| 5,473,602 | A | 12/1995 | McKenna et al. |
| 5,657,317 | A | 8/1997 | Mahany et al. |
| 5,729,826 | A | 3/1998 | Gavrilovich |
| 5,990,831 | A | 11/1999 | McDowell |
| 6,115,409 | A | 9/2000 | Upadhyay et al. |
| 7,986,915 | B1 | 7/2011 | Wang et al. |
| 8,019,029 | B1 | 9/2011 | Katic |
| 8,340,076 | B2 | 12/2012 | Jetcheva et al. |
| 8,676,144 | B2 | 3/2014 | Guo et al. |
| 8,908,609 | B1 | 12/2014 | Naden et al. |
| 2002/0006116 | A1 | 1/2002 | Burkhart |
| 2003/0226091 | A1 | 12/2003 | Platenberg et al. |
| 2004/0146024 | A1 | 7/2004 | Li et al. |
| 2004/0185780 | A1 | 9/2004 | Coupechoux et al. |
| 2004/0233882 | A1 | 11/2004 | Park et al. |
| 2005/0073977 | A1 | 4/2005 | Vanghi et al. |
| 2005/0102529 | A1 | 5/2005 | Buddhikot et al. |
| 2005/0195767 | A1 | 9/2005 | Rahman |
| 2005/0228613 | A1 | 10/2005 | Fullerton et al. |
| 2006/0007882 | A1* | 1/2006 | Zeng ............... H04L 45/00 370/328 |
| 2007/0183321 | A1 | 8/2007 | Takeda et al. |
| 2008/0045215 | A1* | 2/2008 | Chen ............... H04W 76/04 455/435.2 |
| 2008/0072014 | A1 | 3/2008 | Krishnan et al. |
| 2008/0090575 | A1 | 4/2008 | Barak et al. |
| 2008/0095282 | A1 | 4/2008 | Walton et al. |
| 2008/0107081 | A1 | 5/2008 | Isobe et al. |
| 2008/0114863 | A1 | 5/2008 | Baskey et al. |
| 2008/0165776 | A1 | 7/2008 | Tao et al. |
| 2008/0188231 | A1* | 8/2008 | Zhu ............... H04W 72/1252 455/450 |
| 2008/0192677 | A1 | 8/2008 | Abusch-Magder et al. |
| 2008/0291906 | A1 | 11/2008 | Chigurupati et al. |
| 2009/0003243 | A1 | 1/2009 | Vaswani et al. |
| 2009/0029645 | A1 | 1/2009 | Leroudier |
| 2009/0083803 | A1 | 3/2009 | Alshaykh et al. |
| 2009/0104911 | A1* | 4/2009 | Watanabe ............... H04W 36/30 455/436 |
| 2009/0168701 | A1 | 7/2009 | White et al. |
| 2009/0170475 | A1 | 7/2009 | Ch'ng et al. |
| 2009/0190521 | A1 | 7/2009 | Horn et al. |
| 2009/0247182 | A1 | 10/2009 | Tamate |
| 2009/0325615 | A1 | 12/2009 | McKay et al. |
| 2010/0046396 | A1* | 2/2010 | Cai ............... H04W 24/02 370/254 |
| 2010/0046418 | A1 | 2/2010 | Horn et al. |
| 2010/0103845 | A1 | 4/2010 | Ulupinar et al. |
| 2010/0113090 | A1 | 5/2010 | Lin et al. |
| 2010/0142445 | A1* | 6/2010 | Schlicht ............... H04W 4/20 370/328 |
| 2010/0248619 | A1* | 9/2010 | Senarath ............... H04B 7/2606 455/11.1 |
| 2010/0260129 | A1 | 10/2010 | Ulupinar et al. |
| 2010/0273504 | A1 | 10/2010 | Bull et al. |
| 2010/0303182 | A1 | 12/2010 | Daneshrad et al. |
| 2011/0081903 | A1* | 4/2011 | Cai ............... H04W 36/0055 455/424 |
| 2011/0182253 | A1* | 7/2011 | Shekalim ............... H04W 28/18 370/329 |
| 2011/0237231 | A1* | 9/2011 | Horneman ............... H04W 76/048 455/414.1 |
| 2011/0296051 | A1 | 12/2011 | Vange et al. |
| 2011/0320524 | A1 | 12/2011 | Nandagopal |
| 2012/0140697 | A1 | 6/2012 | Chen et al. |
| 2012/0214445 | A1 | 8/2012 | Stojanovski et al. |
| 2012/0231797 | A1 | 9/2012 | Van Phan et al. |
| 2012/0315916 | A1 | 12/2012 | Van Phan et al. |
| 2013/0039214 | A1 | 2/2013 | Yedavalli et al. |
| 2013/0053048 | A1 | 2/2013 | Garcia et al. |
| 2014/0023079 | A1 | 1/2014 | Li et al. |
| 2015/0237564 | A1 | 8/2015 | Wang et al. |

FOREIGN PATENT DOCUMENTS

| | | |
|---|---|---|
| EP | 1 453 246 A1 | 9/2004 |
| EP | 1 826 963 A2 | 8/2007 |
| GB | 2422272 A | 7/2006 |
| IL | 206455 | 7/2011 |
| WO | 2007/054849 A2 | 5/2007 |
| WO | 2008/011717 A1 | 1/2008 |
| WO | 20080046089 A2 | 4/2008 |
| WO | 2009/091011 A1 | 7/2009 |
| WO | 2009134178 A1 | 11/2009 |
| WO | 20100006212 A2 | 1/2010 |
| WO | 2010/047626 A1 | 4/2010 |
| WO | 2011/092698 A1 | 8/2011 |

OTHER PUBLICATIONS

Wikipedia "Tunneling Protocol," accessed 2015, available from http://en.wikipedia.org/wiki/Tunneling_protocol.
Okuda et al. "Multihop relay extension for WiMAX networks—overview and benefits of IEEE 802.16j standard," Fujitsu Sci Tec J, 44, 3, Jul. 2008, p. 292, available on web at http://www.fujitsu.com/downloads/MAG/vol44-3/paper10.pdf.
Toussaint; "The Relative Neighbourhood Graph of a Finite Planar Set;" Pattern Recognition; 1980; vol. 12; No. 4; pp. 1-14.
Torlak; "Spatial Array Processing;" The University of Texas at Austin; http://users.ece.utexas.edu/~bevans/courses/ee381k/lectures/13_Array_Processing/lecture13/lecture13.pdf; pp. 1-25.
Hourani; "An Overview of Adaptive Antenna Systems;" Helsinki University of Technology; Postgraduate Course in Radio Communications (2004/2005); http://www.comlab.hut.fi/opetus/333/2004_2005_slides/Adaptive_antennas_text.pdf; pp. 1-5.
Loadman et al.; "An Overview of Adaptive Antenna Technologies for Wireless Communications;" Communication Networks and Services Research Conference; 2003; Session A3; pp. 15-19.
Santamaria et al.; "Optimal Mimo Transmission Schemes with Adaptive Antenna Combining in the RF Path;" 16th European Signal Processing Conference; Aug. 25-29, 2008; http://gtasweb.dicom.unican.es/files/Publicaciones/Congresos/Eusipco2008_MIMax.pdf.

(56) References Cited

OTHER PUBLICATIONS

Das; "Smart Antenna Design for Wireless Communication using Adaptive Beam-forming Approach;" National Institute of Technology, Rourkela; http://dspace.nitrkl.ac.in:8080/dspace/bitstream/2080/832/1/das1.pdf.

Kootsookos et al.; "Imposing pattern nulls on broadband array responses;" J. Acoust. Soc. Am.; 1999; vol. 105; No. 6; pp. 3390-3398.

Li et al.; "An Examination of the Processing Complexity of an Adaptive Antenna System (AAS) for WiMax;" 2nd IEE/EURASIP DSPEnabledRadio Conference; 2005; pp. 1-5.

Widrow et al.; "Adaptive Antenna Systems;" Proceedings of the IEEE; 1967; vol. 55; No. 12; pp. 2143-2159.

Litva et al.; Digital Beamforming in Wireless Communications; 1996; Artech House, Inc.; Norwood, MA.

Gross, F., "Smart Antennas for Wireless Communications," McGraw Hill, 2005.

Godara, C., "Smart Antennas," CRC Press, 2004.

Ahson, et al., "WiMAX Technologies, Performance Analysis, and QoS," CRC Press, 2008.

Cheuk, et al., "Null-steering LMS Dual-Polarised Adaptive Antenna Arrays for GPS," Journal of Global Positioning Systems (2005), vol. 4, No. 1-2: 258-267.

3GPP TS 36.300—Evolved Universal Terrestrial Radio Access (E-UTRA) and Evolved Universal Terrestrial Radio Access Network (E-UTRAN); Overall description; Stage 2, also available from http://www.3gpp.org/ftp/Specs/html-info/36300.htm.

3GPP TS 36.302—Evolved Universal Terrestrial Radio Access (E-UTRA); Services provided by the physical layer, also available from http://www.3gpp.org/ftp/Specs/html-info/36302.htm.

Wikipedia, "Wideband," accessed 2015, available from http://en.wikipedia.org/w/index.php?title=Wideband&oldid=522580153.

Budsabathon, M., et al.: "Optimum Beamforming for Pre-FFT OFDM Adaptive Antenna Array," IEEE Transactions on Vehicular Technology, vol. 53, No. 4, Jul. 1, 2004, pp. 945-955, XP11115402, IEEE Service Center, Piscataway, NJ, US.

Fazel, K, "Narrow-band interference rejection in orthogonal multi-carrier spread-spectrum communications," Universal Personal Communications, 1994, Sep. 27, 1994, pp. 46-50, XP010131551, New York, NY, USA, IEEE.

U.S. Appl. No. 13/989,589, filed Aug. 29, 2013 in the name of Shoshan.

U.S. Appl. No. 13/989,666, filed Oct. 21, 2013 in the name of Giloh.

Sharp, "Information exchange over a wireless X2 interface between relay nodes," 3GPP TSG RAN WG2 Meeting #66, San Francisco, May 2009, pp. 1-3.

Teyeb et al., "Dynamic Relaying in 3GPP LTE-Advanced Networks," EURASIP Journal on Wireless Communications and Networking, Hindawi Publishing Corporation, vol. 2009, Jan. 2009, pp. 1-11.

Alnajjar et al., "SNR/RP Aware Routing Algorithm: Cross-Layer Design for Manets," International Journal of Wireless & Mobile Networks, vol. 1, No. 2, Nov. 2009, pp. 127-136.

Yamkomeroglu, H., "Fixed and Mobile Relaying Technologies for Cellular Networks," Workshop in Applications and Services in Wireless Networks, Jul. 2002, pp. 75-81.

Mar. 27, 2015 Office Action issued in U.S. Appl. No. 13/575,795.

* cited by examiner

Basic measurement table (40) — What the MS sees and decides

| MS | Base Stations | MS Section QGR |
|---|---|---|
| MS1 | sBS | G |
|  | rBS1 | M |
| MS2 | RBS1 | G |
| MS3 | RBS1 | G |
|  | SBS | B |
| MS4 | RBS1 | G |
|  | SBS | M |
|  | RBS2 | M |
| MS5 | RBS2 | G |
|  | RBS1 | B |
|  | SBS | B |
|  | RBS3 | B |
| MS6 | RBS2 | G |
|  | RBS3 | B |
| MS7 | RBS2 | G |
|  | RBS3 | M |
| MS8 | RBS3 | G |
|  | RBS1 | B |
|  | RBS2 | G |
|  | SBS | M |
| MS9 | RBS3 | G |
|  | RBS2 | M |
| MS10 | 0 |  |
| RMS1 | SBS | G |
| RMS2 | RBS3 | G |
|  | RBS1 | M |
|  | SBS | B |
| RMS3 | N |  |

Mobiles connection decisions (41)

| MS | Base Stations | MS Section QGR | MS Connectivity decision |
|---|---|---|---|
| MS1 | sBS | G | SBS |
|  | rBS1 | M |  |
| MS2 | RBS1 | G | RBS1 |
| MS3 | RBS1 | G | RBS1 |
|  | SBS | B |  |
| MS4 | RBS1 | G | RBS1 |
|  | SBS | M |  |
|  | RBS2 | M |  |
| MS5 | RBS2 | G | RBS2 |
|  | RBS1 | B |  |
|  | SBS | B |  |
|  | RBS3 | B |  |
| MS6 | RBS2 | G | RBS2 |
|  | RBS3 | B |  |
| MS7 | RBS2 | G | RBS2 |
|  | RBS3 | M |  |
| MS8 | RBS3 | G | RBS3 |
|  | RBS1 | B |  |
|  | RBS2 | G |  |
|  | SBS | M |  |
| MS9 | RBS3 | G | RBS3 |
|  | RBS2 | M |  |
| MS10 | 0 |  | N |
| RMS1 | SBS | G | SBS |
| RMS2 | RBS3 | G | RBS3 |
|  | RBS1 | M |  |
|  | SBS | B |  |
| RMS3 | N |  | N |

The routing table that the rRM sees (42)

|  | Section 1 | Section 2 | Section 3 |
|---|---|---|---|
| MS1 | sBS G |  |  |
| MS2 | rBS1 G | sBS |  |
| MS3 | rBS1 G | sBS |  |
| MS4 | sBS G |  |  |
| MS5 | rBS2 G | rBS3 M |  |
| MS6 | rBS2 M | rBS3 G |  |
| MS7 | rBS2 G | rBS3 G |  |
| MS8 | rBS3 G | sBS X | sBS X |
| MS9 | rBS3 M | sBS X | sBS X |
| MS10 | rBS3 B | sBS X | sBS X |

G - Good measurement results
M - Medium measurement results
X - Bad quality

Fig. 4

Rescue operation example

| Step | MS | Base Stations | MS Section QGR | MS Connectivity decision |
|---|---|---|---|---|
| A | MS5 | sBS | G | sBS |
| | | rBS1 | M | |
| | | rBS2 | G | |
| B | MS5 | sBS | X | |
| | | rBS1 | M | |
| | | rBS2 | G | |
| | rMS1 | sBS | G | sBS |
| | | rBS2 | G | |
| | rMS2 | sBS | G | sBS |
| | | rBS1 | G | |
| C | MS5 | sBS | X | rBS2 |
| | | rBS1 | M | |
| | | rBS2 | G | |
| | rMS1 | sBS | G | sBS |
| | | rBS2 | M | |
| | rMS2 | sBS | X | rBS1 |
| | | rBS1 | G | |

|   |   | Section 1 | | Section 2 | | Section 3 | |
|---|---|---|---|---|---|---|---|
| A | MS5 | sBS | G | | | | |
| | | rBS1 | G | | | | |
| | | rBS2 | G | | | | |
| B | MS5 | sBS | X | sBS | G | | |
| | | rBS1 | M | sBS | G | | |
| | | rBS2 | G | | | | |
| C | MS5 | sBS | X | sBS | M | | |
| | | rBS1 | M | sBS | X | | |
| | | rBS2 | G | rBS1 | G | sBS | G |

Wrong decision

Sections Measurements Table for MS5

| MS | Route number | Section description | | | Measurements | | |
|---|---|---|---|---|---|---|---|
| | | Section 1 | Section 2 | Section 3 | 1 | 2 | 3 | Route QGR |
| MS5 | 1 | MS5-rBS2 | rBS2-sBS | | G | X | | X |
| | 2 | MS5-rBS1 | rBS1-sBS | | M | M | | M |
| | 3 | MS5-rBS2 | rMS2-RBS1 | rMS1-sBS | G | B | G | B |
| | 4 | | | | | | | |
| | 5 | | | | | | | |

MS5 must be connected to rBS1

Fig. 14

CELLULAR COMMUNICATION SYSTEM WITH MOVING BASE STATIONS AND METHODS AND APPARATUS USEFUL IN CONJUNCTION THEREWITH

REFERENCE TO CO-PENDING APPLICATIONS

This is a Divisional Application of application Ser. No. 13/575,795 filed Jul. 27, 2012 which is a National Phase of PCT/IL2011/000096 filed on Jan. 27, 2011 which claims priority from Israel Application No. 203568 filed Jan. 28, 2010, and from Israel Application No. 206455 filed on Jun. 17, 2010. The disclosures of the prior applications are hereby incorporated by reference herein in their entirety.

FIELD OF THE INVENTION

The present invention relates to mobile communication networks and in particular to cellular communication networks.

BACKGROUND OF THE INVENTION

Many mobile communication networks are known, including 4G networks. "mobile ad hoc network" (MANET) technology is known. E-UTRAN is a known standard. WiMAX and 3G network systems are known.

A known MANET algorithm is described in Fuad Alnajjar and Yahao Chen, "SNR/RP aware Routing Algorithm Cross—Layer Design for MANET" (IJWMN, Vol 1, No 2, November 2009).

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide an intermediate approach which may be based on the E-UTRAN standard and that implements a wireless backhaul solution via a mobile relay layer which dynamically alters its connectivity to keep itself synchronized with the mobile stations.

Certain embodiments of the present invention seek to provide a cellular communication network in which there are mobile communication devices, a stationary core and typically at least one stationary base station, and at least one mobile base station. The mobile base stations extend the "reach" of the network such that the most distant mobile elements speak to base stations, mobile and/or stationary, in back of them and so on, in a series of hops, back to the core.

Certain embodiments seek to provide mobile base stations each having a "mobile telephone functionality" (other than input/output such as dialing and ringing) on it which knows how to report to its mobile base station as to what base stations it sees.

Certain embodiments seek to provide a radio manager on (co-located with) a mobile base station communicating via radio with "colleague" radio managers on other mobile base stations.

Certain embodiments seek to provide use of the information provided by the above communication network configuration, so as to enable an individual mobile base station to determine whether it should accept mobile communication devices which turn to it, or whether it should reject them because it knows they can do better elsewhere since the individual mobile base station is currently poorly connected back to the core or not connected at all, whereas other mobile base stations are better connected. In contrast, in conventional systems without moving base stations, the base station, being stationary, is always connected back to the core.

Certain embodiments seek to provide a system for implementing a E-UTRAN network that includes a network infrastructure in motion, the system comprising a plurality of mobile relays (mRS), each accommodating a typically small E-UTRAN base station (rBS), an E-UTRAN mobile station (rMS) and a local radio management unit (rRM) having a standard E-UTRAN communication layer which communicates with its co-located mobile station (rMS) and its co-located base station (rBS) in order to gather channel quality information characterizing at least one and preferably all mobile stations connected to the co-located base station and also the measurements of its own co-located mobile station. The local radio management unit typically also includes an in-band multi-hop backhauling functionality which may replace conventional generally proprietary decision layers in the E-UTRAN rRMs which use the channel quality information to associate mobile stations with base stations.

Certain embodiments of the present invention seek to provide a tactical communication network whose infrastructure is on the move, typically not based on "mobile ad hoc network" (MANET) architecture that exhibits horizontal topology where each node either serves as a subscriber terminal or as a relay between two nodes that do not have connectivity, nor on the classic cellular architecture, in which base stations are not designed for any movement. Instead, only the mobile subscribers are expected to move.

The in-band multi-hop backhauling functionality may be operative to enhance immunity due to terrain or other interferences by creating new alternative routes to replace routes that are dropped due to terrain or other motion-caused interferences, wherein each new alternative route includes a section between the end-user mobile station and mobile relay it is connected to, and a backhauling section, including the links between the mobile relays that take part as nodes in the route. The functionality may include measuring the quality of each section and finding the route or combination of sections which provide best quality connection to the core network.

Tactical communication networks, in which entire network infrastructures are mobile, have adopted MANET technologies due to the fact that they enable easier sharing of data and attain greater situation awareness.

A "mobile ad hoc network" (MANET) is an autonomous system of mobile routers connected by wireless links. The routers are free to move randomly and organize themselves arbitrarily; thus the network's wireless topology may change rapidly and unpredictably. Each node acts as a router, forwarding data packets for other nodes. As the nodes move, point to point link may be dropped due to terrain interference or simply because they move beyond the range of other nodes. Therefore, such network stability is continually stressed as nodes drop in and out of the mesh.

Certain embodiments of the present invention adopt E-UTRAN central architecture, in which there are permanent base stations that are 'nailed down' to fixed locations with fix backhauling (101). The mobile part of the infrastructure (100) contains mobile relays that act according to the roles of the E-UTRAN. Contrary to MANET topology, in which the entire network is mobile, and connections between mobile nodes can change rapidly and unpredictably, and in which network stability is continually stressed as nodes drop in and out of the mesh, certain embodiments of the present invention are based on a centralized approach and the assumption that the nailed part of the network (101) is stable. The relay layer (100) is located in between the network side in which there are standard fixed base stations, and the access side, where there are standard mobile stations (UE/MS layer). In order to communicate with standard base stations (sBS) on one side, and standard mobile stations (MSs) on the other side, the mobile relay layer has implemented, in this E-UTRAN network, in-band multi hop mobile backhauling in which it acts as mobile stations toward the static base stations (BSs) and as base stations toward the mobile stations (MSs) as depicted in FIG. 1 and FIG. 10. In this approach, the topology of the network remains relatively steady. The connectivity of the network is central and depends both on the fixed, nailed base stations and the relay layer. In this case, even if one of the relay nodes is dropped down due to terrain interferences, the effect is smoothed down because, unlike the MANET, the network is centralized towards a core network that is located in a safe and permanent location. Even if a node is dropped down, traffic is backhauled through other relay nodes along with static base stations towards the core network.

Certain embodiments of the present invention provide management methods that combine a centralized approach (in the core network) and a distributed approach (in the relay network) into one solution.

Management methods for standard cellular communication networks are now described. Cellular communication systems are based on base stations that are located in places chosen to provide optimal communication conditions and network coverage. Each base station is usually located in a permanent place for a long period (month, years), and thus backhauling to the base station is fixed and can employ E1 lines, fiber or microwave links, which connect the base stations to the core network. In such typical cellular networks, the mobile unit, which is the user handset, is the only mobile network element that moves from one place to another, and the network should follow the user in order to provide connectivity and telecommunication services.

In such a standard cellular network, the desired user bit rate and quality of service should be maintained, regardless of the user's mobility within the coverage area. In wireless systems, appropriate handover, which is one of the fundamental RRM techniques, is critical to ensure desired user performance. The handover execution is typically triggered by user feedback: measurement reports and/or network configured events. Different types of measurements and events also give rise to various categories of handovers. It is important that user quality is maintained after the handover, to avoid a 'ping pong' effect, and minimize the signaling associated with handover procedures.

Mobile station measurements may be as follows: In E-UTRAN the following three downlink neighbor cell measurements are specified primarily for mobility:
  Reference symbol received power (RSRP)
  Reference symbol received quality (RSRQ):
    RSRQ=RSRP/carrier RSSI
  E-UTRA Carrier RSSI The RSRP and RSRQ measurements are performed by the Mobile Station (MS), which is the E-UTRA mobile terminal, for each cell on a cell specific known pilot sequence called reference symbols. The E-UTRA carrier RSSI is measured over the entire carrier; it is the total received power and noise from all cells (including serving cells) on the same carrier, or other carriers, as has been defined in the LTE Advanced, in which several component carriers may be used. The two reference symbol-based measurements (RSRP and RSRQ) are preferably used for mobility decisions.

In general terms RSRP and RSRQ can be regarded as 'signal strength' type and 'signal quality' type measurements respectively. In WCDMA, CPICH RSCP and CPICH Ec/No are the corresponding 'signal strength' and 'signal quality' measurements respectively. In other words E-UTRAN RSRP and RSRQ measurements are analogous to WCDMA CPICH RSCP and CPICH Ec/No measurements respectively. As in E-UTRAN, in WCDMA the CPICH Ec/No is the ratio of CPICH RSCP to UTRA carrier RSSI.

The neighbor cell measurements are typically averaged over a long time period in the order of 200 ms or even longer to filter out the effect of small scale fading. Additional network configured time domain filtering can be used to further filter out the effect of fading.

There may also be a requirement on the MS to measure and report the neighbor cell measurements (e.g. RSRP and RSRQ in E-UTRAN) from a certain minimum number of cells. In E-UTRAN this number is 8 cells (comprising of one serving and seven neighbor cells) on the serving carrier frequency (or commonly termed as intra-frequency), This number is slightly lower (e.g. 4-6 cells) for measurements carried out on non serving carrier frequency.

MS Reported Events for Mobility are now described. Instead of requesting the MS to report the entire measurement quality, the MS can be configured to only report events, which in turn are triggered by measurement reports. The events are then reported to the network. The events can be sub-divided into absolute and relative events. An example of an absolute event is when serving cell RSRP falls below an absolute threshold. Another example comprises a serving cell's RSRQ falling below an absolute threshold.

An example of a relative event is when a neighbor cell's RSRQ becomes stronger than that of the serving cell by a certain margin (i.e. relative threshold). The cell(s) involved in evaluating an event may operate on the carrier frequency of the serving cell or y may operate on different carrier frequencies e.g. serving cell on carrier frequency F1 and neighbor cell on carrier frequency F2. In response to the occurrence of one or more of the above events, the network can take further actions such as a handover decision, which may require it to send a handover command to the MS.

The above described measurements and events are used for mobility decisions. There are typically two kinds of mobility scenarios:
  Idle mode mobility: cell reselection
  Connected mode mobility: handover Cell reselection is typically an MS autonomous function without any direct intervention of the network. The cell reselection decision at the MS is based on downlink measurements on the serving and target cells. The network can configure the MS to use RSRP or/and RSRQ and the associated absolute or relative thresholds for cell reselection. The configuration is carried out by transmitting relevant information and parameters on the broadcast channel. Thus, to some extent, MS cell reselection behavior is still controlled by the network. The standard also specifies some rules that govern MS behavior when performing cell reselection.

Handover, on the other hand, is fully controlled by the network through explicit MS specific commands and by standardized rules in the specification. The reported events are exclusively used for handovers. In addition, actual measurement reports may also be used by the network for executing handovers.

New 4G commercial cellular communication networks have adopted a new architecture that is based on many small Pico-Femto cells instead of macro-cells. This networking approach enables (with Adoptive Modulation Code techniques) to utilize the spectrum in a much more efficient manner and to provide broadband communication services, while overcoming harsh urban environments. Furthermore, in order to lower backhauling expenses and enhance spectrum utilization, in some cases the base stations are replaced with relays that use the access spectrum for backhauling traffic. In this case, one of the challenges of such a network is related to a network's routing and radio resource management (RRM).

In the abovementioned scenario, the base stations (or relays) and the backhauling networks are fixed and are located in permanent places which are chosen in advance to provide optimal traffic throughput, subject to the assumption that the backhauling bandwidth is relatively steady.

Certain embodiments of the present invention relate to a specific scenario in which the base stations are mobile and backhauling performances can be changed dramatically.

Certain embodiments of the present invention seek to provide an improved method for implementing a tactical moving wireless network. Today there are two counter approaches to implementing such a wireless network. The first one is the cellular approach. This approach is similar to the current cellular network in the sense that it encompasses base stations and mobile stations. However, legacy base stations today are not planned for any movement; only the mobile subscribers are expected to move. In order to enable base stations to move, several challenges need to be addressed, such as implementing wireless backhaul which should be able to alter its connectivity dynamically, to keep synchronization with the served subscribers, and to maintain a dynamic changing frequency plan to avoid interference. The other available contender solution for a moving wireless network is the "mobile ad-hoc network" (MANET), which exhibits horizontal topology where each node either serves as a subscriber terminal or as a relay between two nodes that does not have connectivity. Such a network faces significant challenges to maintain effective routing that should track rapid, dynamically changing connectivity. They also face significant difficulties to support multi service networks while maintaining both quality and level of service. Certain embodiments of the present invention propose a middle approach somewhere between both these approaches. Certain embodiments of the present invention implement multi-hop relay instead of MANET. The network encompasses a macro base station that is usually the only node that is planned to be located in a fixed position, relay stations which are base stations, typically small base stations, that are fed in a wireless manner either from a super ordinate relay or from the macro base station. Each relay is capable to serve mobile stations and subordinate relays. The dynamic routing and frequency assignment problems are of a significantly lower scale than with MANET networks due to the fact that the backhaul routes and frequency assignment are only restricted to the relays, while MSs routing and frequency assignments are done through a conventional handover process. Such networks can support multi-service capabilities very similar to the way 4G cellular networks do. Routing tracking is more straightforward also due the fact that its topology is far less complex due to its tree resemblance rather than a mesh topology.

Certain embodiments of the present invention provide methods to manage the radio resources of a 4G E-UTRAN LTE (or WiMAX) cellular network in which part of its base stations move. As already described, and as depicted in FIG. 10, typically, instead of an entire network moving (which is the MANET assumption), the methods shown and described herein assume a networking case in which a portion of its infrastructure is permanent and nailed down to a fixed location, while another part of the network moves along with users' mobile stations. Certain embodiments of the present invention combine a centralized management approach, which is related to a permanent part, and a distributed management approach, which is related to the network's moving part, into one management solution.

In such a network, the backhauling of the nailed down infrastructure is steady, while the backhauling of the moving infrastructure can be dropped, due to terrain interferences or simply because they move beyond the range of the fixed base stations.

In order to solve the problem of E-UTRAN/WiMAX network "on the move" certain embodiments of the present invention may utilize a solution of in-band backhauling. In this case each mobile base station is turned into a mobile relay by adding to it a standard mobile station. Certain embodiments of the present invention are related to the specific case of network topology that is depicted in FIG. 1, in which the standard base station layer of the network is divided into two layers:

One layer of static base stations—sBS (2) that are located in permanent locations and act under usual conditions and according to the standard rules of the E-UTRAN and Another layer of moving Base Stations—rBS(63) that, with the backhauling mobile station—rMS(51), are actually mobile relay stations (63).

In order to overcome the problem of backhauling changes due to the mobility of the relays, certain embodiments of the present invention base their network management solution not on MESH or MANET topologies but on a new approach that combines centralized and distributed radio management into one Routing and Radio Resource Management (RRM) solution. This approach is depicted in FIG. 7. The network RRM is divided into two entities:

Centralized RRM entity (62) that is inside the MME (or ASN GW in WiMAX network) and Distributed network (60) of relay Radio Resource Managers—rRM (58), (59), (50) that are located in each relay.

The DisNetRM (61) in FIG. 7 is an entity that co-ordinates between the standard central RRM activity and the distributed rRMs network activity. In a case where all end-user mobile stations have connectivity to the steady nailed down base stations, the DisNetRM updated the distributed rRMs and networks management is done in a centralized manner by main RRM that is located in the MME (62). In case backhauling links are dropped due to terrain interference or simply because they move beyond the range of the steady nailed base stations (sBSs), the rRMs come into operation and provide backhauling connectivity by utilizing multi-hop routes between the mobile relays.

According to certain embodiments, a method is provided to manage the radio resources of this network by combining rMSs backhauling measurement results and end-user MS measurements into one Quality Grade Result (QGR) according to which handover cell reselection load control is carried out.

The network's mobile relay managers—rRMs, can communicate between each other and establish alternative routes in case of backhauling problems. Such a network is depicted in FIG. 2. Mobile stations (14) can be connected directly to the core network via a fixed standard base station (10), or through a relay (11) or several relays in a multi-hop route. Each relay functions as a standard base station (rBS) at its access side, and as a mobile station (rMS) at its backhauling side.

Certain embodiments of the present invention are related to radio resource management of such a mobile relay network, as depicted in FIG. 2. The distributed management solution is based on special local RRM mangers (rRM—relay Radio Manager). These rRMs are connected between each other over standard S1/X2 LTE (or R4 WiMAX) protocols, and are responsible for the Handover, Cell selection/reselection and Load control of this network in cases where the centralized RRM is unable to control parts of the network due to degradation in performance of the backhauling network. Each rRM typically is operative to perform at least one and preferably all of the following functionalities:

Multi section route method to make decisions with regard to handover and cell selection
Frequency band carriers selection
In-cell connectivity method A simplified diagram of the relay structure, according to certain embodiments, is depicted in FIG. 7. In this solution the relay internal base station (the rBS) and its internal mobile station (rMS) are standard. Their PHY and MAC layers are according to the E-UTRAN (or WiMAX) without changes.

According to certain embodiments of the invention, a functionality is provided in the rRM that receives from the rMS a report such as a conventional Network Measurement Report (NMR) via the rMS's Ethernet port. The NMR is usually sent just to the remote base station in which the MS is camped on. In this solution, the rMS is controlled by the rRM and provides measurement information both to the remote BS as well as to the local rRM.

The rBS is connected to the rRM via an Ethernet port that carries the standard R6 (WiMAX) or S1/X2 (E-UTRAN) messages. The backhauling traffic of this mobile relay is carried over the rMS, and due to the fact that the relay is mobile, there is no guarantee that the backhauling bandwidth is sufficient, or that there is a backhauling connection at all. In such cases, the immunity solution is based on the numerous routes that can be established between the mobile relays. Certain embodiments of the present invention provide methods to manage the system in such a unique case.

In standard commercial networks, in which the base stations and the relay stations are fixed, the only network element that is mobile is the MS that performs measurements (like RSRP, RSSI, RSRQ) to maintain quality of service. Based on these measurements, handover and network entry decisions are made. In such standard networks these MS measurements are sufficient, since base stations are steady and the backhauling performances do not change.

In the network scenario mentioned above, in which base stations and relays are moving, it is necessary to consider the measurement of each MS/rMS in every section/hop on the route. For example, the route of MS5 in FIG. 2 contains 3 sections/hops: section g (15), k (16) and d (17). The problem is that in cases where the rRM handover decision is based on the measurements of MS5 only, it may not take into consideration the measurements of rMS2 and rMS3; although section g (15) measurements results are of a good quality, the whole route performance might be of poor quality if measurements of section k(16) show that the quality is not sufficient. In this case, a decision to handover MS5 to this route may be erroneous.

Certain embodiments of the present invention overcome these deficiencies and solve the above identified problem by providing methods that take into consideration the measurements of all the mobile stations (the MS and the rMSs) along the specific route. All measurements done by all of the mobiles along each specific route may be combined and a quality grade result (QGR) may be provided to each route. Handover and network entry decisions are based upon this QGR result.

According to certain embodiments of the present invention, there is provided a method in which the route tables are built, and contain the MS measurements for each section of the route. The method scans this table and sorts each route to several grades of service quality.

The QGR of each alternative route is transferred to the MSs as well. Each MS receives the QGRs that are related to its alternative routes. This is important in the case of idle mode, in which the MS can choose the base station on which to camp, without network involvement. In the standard case, while the MS relies on its own measurements only, it may choose to camp on rBS without backhauling. The QGR table prevents this occurring. If the QGR=0 for a specific rBS (although the MS quality measurements are good), the MS can decide to camp on other rBS (that has inferior measurement quality, but still may have backhauling).

Certain embodiments of the present invention aim to provide partial connectivity in a mobile network, between groups of specific subscribers, while one section of the route is in inferior condition (or may even be disconnected). The method provided in accordance with certain embodiments of the present invention aims to identify which users can be communicated with others and to provide handover services in this portion of the network to enhance connectivity. For example, in FIG. 2, although section d (17) is disconnected or has very poor quality, rRM2(12) and rRM3(13) maintain connectivity to their MSs and handover decisions between rBS2 and rBS3 can be made.

According to certain embodiments of the present invention, if there is a backhauling section with poor quality, the rRM is able to analyze whether the poor quality of this section is caused as a result of transmission of its co-located rBS or neighbor rBS. In such a case, the rRM (and/or the neighbor rRM) can operate its rBS in silence mode, in which the MAPs in the downlink (DL) portion of the frame may be empty and thus enable its rMS to receive the DL transmission of the remote base station (rBS or sBS). FIG. 9 depicts this case.

According to another embodiment of the invention, the connectivity tables and routing tables are transferred in a standard manner between all the rRMs in a way that the same updated Section Measurement Table exists in each rRM (FIG. 3). The same functionality exists in each rRM so each automatically receives the same routing result, and the one that serves the MS may perform it.

According to another embodiment of the invention, update measurement information may be transferred between the rRMs through the rRMs standard protocol, meaning R4 protocol in WiMAX and S1/X2 protocol in LTE. In cases where one of the rRMs is disconnected from the network, there is a method to update this rRM in a specific update message.

Although the description of the invention given here is directed to the E-UTRAN LTE system, the invention may also be employed in WiMAX or 3G network systems as well.

There is thus provided, in accordance with certain embodiments of the present invention, a method for implementing tactical E-UTRAN network parts of whose network infrastructure are on the move along with the end-user mobile stations. The moving infrastructure includes a plurality of mobile relays (mRS), each accommodating a base station (rBS), typically a small base station, mobile station (rMS) and local radio management unit (rRM). The backhauling of these mobile relays is in-band multi-hop backhauling to enhance immunity. The in-band multi-hop backhauling network enables to create new routes that become alternative to the routes that were dropped due to terrain or other interferences. Each route includes a plurality of sections: Section between end-user mobile station and the mobile relay which it is connected to, and backhauling sections, which are the links between the mobile relays that take part as nodes in the route.

Also provided, in accordance with certain embodiments of the present invention, is a network of local relay managers (rRMs) and a central manager (RRM) that combine central managing approach and distributed managing approach into one managing solution. This is by detecting the quality of each end-user section and the quality of each backhauling section according to the MSs and rMSs measurements (RSRP, RSRI, RSRQ) and combines them into quality grade results (QGR) for the actual route and alternative routes of each end-user mobile station (MS). The results are broadcast to the end-user MSs as well and decisions for handover and cell admission and cell reselection are done by having for each route the quality result of the access and backhauling sections.

Further in accordance with certain embodiments of the present invention, the QGR is created by a weighted algorithm.

Still further in accordance with certain embodiments of the present invention, the centralized RRM (62) is communicated with the rRMs network (60) through the centralized distributed manager -DisNetRM (61). In the distributed rRM network each relay manager (50) gets measurement reports information from the other participant relay managers (58), (59) over the relay manager's sub-network (60) and measurement RSRP, RSRI and RSRQ measurements from its co-located relay MS (51) and end-user MSs (55), (56), (57) to build one radio resource measurements table.

Additionally in accordance with certain embodiments of the present invention, the measurement information is spread by broadcast message type to all rRMs and RRM.

Further in accordance with certain embodiments of the present invention, the method spreads the QGR of all the alternative routes to the MS over broadcast message. The MS broadcast message relates to each base station and is sent to the MSs that camp on this base station Also provided, in accordance with certain embodiments of the present invention, is a method for deciding on handover and network entry in LTE/WiMAX tactical network that is based on LTE mobile relays. In this network, routes between end-user MSs up to the static base station may be established through the relay backhauling MSs in several hops. The methods comprise measurements (73), (74), (75) of the radio sections of each alternative route that are established by the mobile relays. The method comprises all these measurements to one entity and decides about Handover and MS admission operations.

Additionally provided, in accordance with certain embodiments of the present invention, is a method for establishing the same database to the relay radio managers (rRMs) distributed network. The method exists in each rRM and is responsible for building tables (40), (41), (42) and the section measurement table (43) in each rRM and updating this database.

Further provided, in accordance with certain embodiments of the present invention, is a functionality for distributing rMS section measurements which is installed in each rMS and distributes link quality measurements to the remote base station in which it is connected to, as well as to its co-located rRM. Thus the rMS can be aware of its existing backhauling quality and initiates handover operation.

Yet further provided, in accordance with certain embodiments of the present invention, is a cell reselection functionality located in each MS and which receives, periodically, the QGR report of each route. Thus, while the mobile is in idle mode and wants to camp on a new relay base station, its decision may be based not only on its own measurements, but on the backhauling rMSs measurements as well.

Still further in accordance with certain embodiments of the present invention, a handover functionality is located in each rRM. In this distributed network, the local rRM is responsible for handover operation of its collocated rMS.

In tables 40, 41, 42 and 43, the QGR—Quality Grade Result has 3 quality values: G-good, M-medium, X-bad. These values are combination of the SNR and the statistical metrics. The SNR is the minimum SNR that is needed for modulation constellation according to the 3GPP E-UTRAN tables.

The weight of the STD, Means and Median on the QGC will be set up in field experiments.

According to certain embodiments, users are shown a good or best location for QGR. The statistical measurements of the co-located MS in each relay may be attached to the location results of the relay. The rRM may have a functionality that computes and indicates to the user locations with good or best QGC. This allows the user to locate the relay in the best backhauling place, e.g. in tactical applications.

According to certain embodiments, in the event that a 3 (say) hop communication route is being used, the relay R that is connected to the core network via another relay A, sends a message to the backhauling relay B that it—R—is A's anchor. The backhauling relay then becomes aware that another relay is connected to it and typically finds a best place to remain.

Also provided, in accordance with certain embodiments of the present invention, is a mobile communication network system comprising a core network including a core device and at least one static base station; a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical backconnection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations, and for using the information to determine whether to reject at least one mobile station seeking to be served by an individual base station associated with the individual co-located radio manager, the information including at least some of information regarding qualities of other base stations' respective connections back to the core network, information regarding quality of the first radio manager's moving base station's connection back to the core network, and information regarding channel qualities which the first radio manager's own base station, and base stations other than the first radio manager's own base station, are respectively able to provide, to mobile stations in the vicinity of the first radio manager.

Further in accordance with certain embodiments of the present invention, the information regarding qualities of respective connections of respectively co-located radio managers back to the core network is provided by respectively co-located radio managers via a selected one of a static base station from among the at least one static base station of the core network; and a moving base station capable of providing service to the individual radio manager's co-located mobile device.

Still further in accordance with certain embodiments of the present invention, the information re quality of its own connection back to the core network is provided by its own co-located mobile station.

Additionally in accordance with certain embodiments of the present invention, the information re channel quality which other base stations are able to provide mobile stations in the vicinity of the individual co-located radio manager is provided by reports generated by the mobile stations in the vicinity.

Further in accordance with certain embodiments of the present invention, the information re quality of service available from its own base station for mobile stations in the vicinity of the individual co-located radio manager is provided by its own co-located mobile station.

Still further in accordance with certain embodiments of the present invention, each the co-located radio manager is operative to compute, for at least one individual mobile station, route comparison information including a plurality of routes of base stations via which the individual mobile station can communicate with the core network and at least one parameter characterizing the relative quality of each of the routes and to communicate to the individual mobile station information indicative of the route comparison information and wherein the individual mobile station is operative to select a base station to be connected to at least partly based on the information indicative of the route comparison information.

Additionally in accordance with certain embodiments of the present invention, the parameter is based upon a minimum SNR value, over sections which together compose a route, each section having its own SNR value.

Further in accordance with certain embodiments of the present invention, the parameter characterizing route quality is a combination of measured qualities of route sections and fluctuations thereof such that route sections with largely fluctuating quality measurements are devalued due to their unpredictability.

Still further in accordance with certain embodiments of the present invention, at least one individual co-located radio manager includes a mobile-to-mobile direct communication facilitation functionality operative to provide direct communication, not requiring the core network, between a plurality of mobile devices in the individual radio manager's vicinity.

Additionally in accordance with certain embodiments of the present invention, the moving base station observes a silence period during which it refrains from transmitting to its own co-located mobile station.

Still further in accordance with certain embodiments of the present invention, at least one characteristic of the silence period is dynamically determined by the moving base station's co-located radio manager.

Further in accordance with certain embodiments of the present invention, the characteristic comprises a zone in which silence is observed which is defined over at least one of a frequency band and a time window.

Still further in accordance with certain embodiments of the present invention, the E-UTRAN network comprises a tactical E-UTRAN network.

Additionally in accordance with certain embodiments of the present invention, if a multi-hop communication route is used, in which a relay R that is connected to the core network via another relay A, relay R sends a message to a backhauling relay that R is A's anchor.

Further in accordance with certain embodiments of the present invention, the static base station is co-located with the core device.

Still further in accordance with certain embodiments of the present invention, the physical back-connection comprises an Ethernet back-connection.

Still further in accordance with certain embodiments of the present invention, the radio resource manager comprises an E-UTRAN radio resource manager.

Also provided, in accordance with certain embodiments of the present invention, is a mobile communication networking method comprising Providing a core network including a core device and at least one static base station; a plurality of base stations; and a population of mobile stations communicating via antennae with the base stations; the base stations including at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable static base station, wherein the first radio manager comprises a radio resource manager; and functionality for receiving information from, and sending information to, other radio managers, respectively co-located with other moving base stations; and using the information to determine whether to reject at least one mobile station seeking to be served by an individual base station associated with the individual co-located radio manager, the information including at least some of information regarding qualities of other base stations' respective connections back to the core network, information regarding quality of the first radio manager's moving base station's connection back to the core network, and information regarding channel qualities which the first radio manager's own base station, and base stations other than the first radio manager's own base station, are respectively able to provide, to mobile stations in the vicinity of the first radio manager.

Still further in accordance with certain embodiments of the present invention, users are shown a good location for QGR.

Additionally in accordance with certain embodiments of the present invention, statistical measurements of a co-located MS in each at least one relay are attached to location results of the relay and wherein the system includes at least one rRM having a functionality that computes and indicates to the user locations with good QGC.

Further in accordance with certain embodiments of the present invention, the backhauling relay becomes aware that another relay is connected to it and finds a good place to remain.

Typically, each rRM speaks to its co-located base station according to conventional protocols e.g. as per the E-UTRAN standard communication layer. However, when a rRM speaks to its co-located mobile station (rMS), there is typically no conventional protocol in the sense that conventionally, only base stations speak to end units e.g. mobile stations whereas conventional RRMs speak only to base stations. To overcome this, according to certain embodiments of the present invention, rRMs may "masquerade" as base stations e.g. by sending a request to an rMS to execute an NMR measurement.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIG. 4 is a tabular diagram of a data base and a method of building the tables constructed and operative in accordance with certain embodiments of the present invention.

FIG. 14 is a diagram showing use of tabled information, according to certain embodiments of the present invention, to cope with the advancement shown in FIG. 13.

DETAILED DESCRIPTION OF CERTAIN EMBODIMENTS

Figure 1:
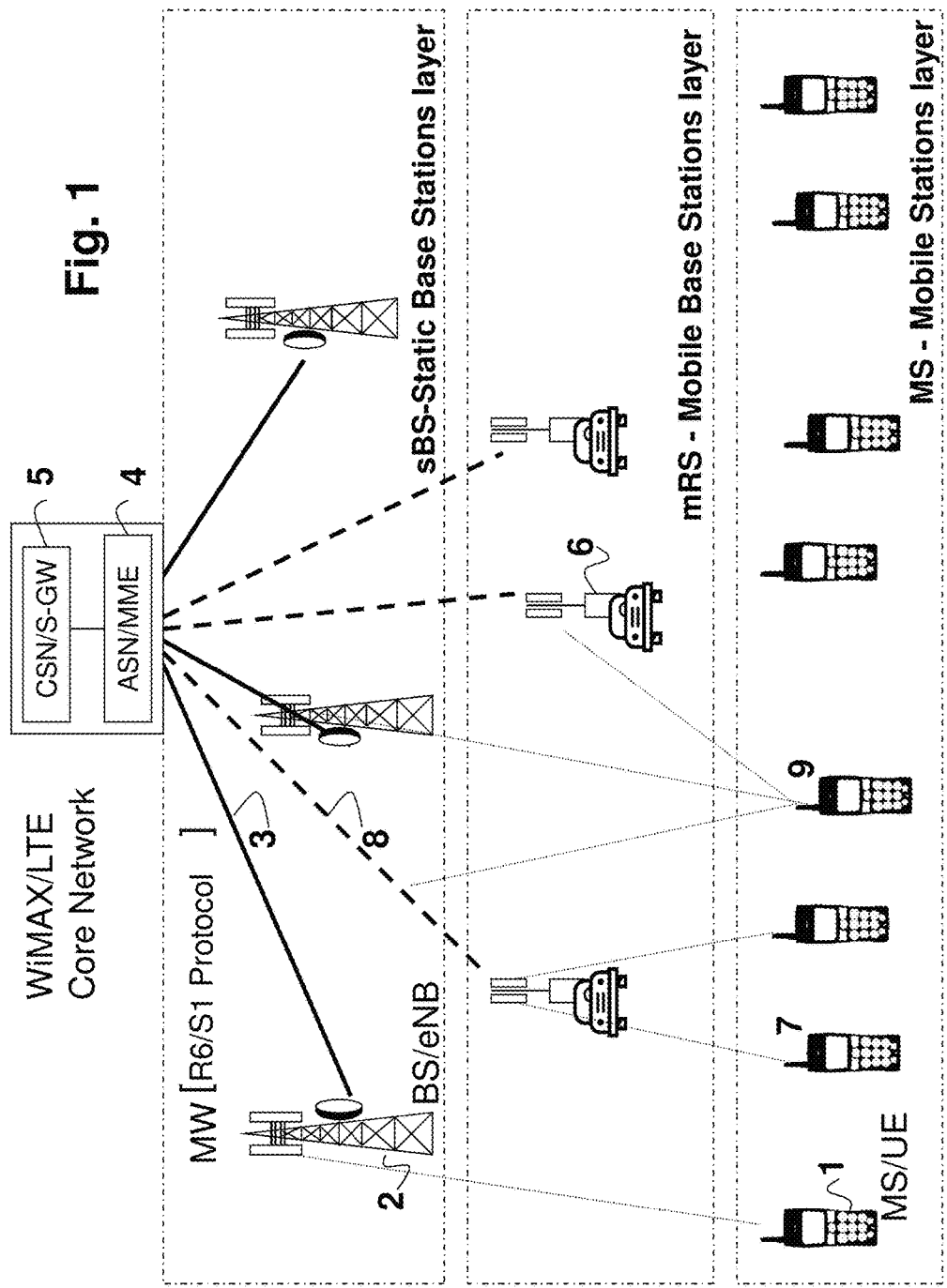
FIG. 1 is a simplified pictorial diagram of a LTE/WiMAX network that uses mobile base stations.

The following terms may be construed either in accordance with any definition thereof appearing in the prior art literature or in accordance with the specification, or as follows:

1×RTT CDMA2000 1× Radio Transmission Technology
CPICH Common Pilot Channel
E-UTRA Evolved UTRA
E-UTRAN Evolved UTRAN
FDD Frequency Division Duplex
GSM Global System for Mobile communication
HRPD CDMA2000 High Rate Packet Data
P-CCPCH Primary Common Control Physical Channel
RSCP Received Signal Code Power
RSRP Reference Signal Received Power
RSRQ Reference Signal Received Quality
RSSI Received Signal Strength Indicator
TDD Time Division Duplex
UTRA Universal Terrestrial Radio Access
UTRAN Universal Terrestrial Radio Access Network
mRS Mobile Relay
rBS Relay Base Station
rMS Relay Mobile Station
QGR Quality Grade Result
MANET Mobile Ad Hoc Network
MME Mobile Management Entity
S-GW Service Gateway
MS Mobile Station In existing cellular networks handover and network entry decisions are made according to radio channel quality between mobile stations (MS) and surrounding base stations. Radio channel quality is determined by measurements that are made by the MS. Due to the fact that the base stations are located in permanent places, the backhauling is considered steady and there is no need to perform any backhauling measurements for the handover process. FIG. 1 describes the case of such a commercial network. LTE and WiMAX standards have not found reasons to make backhauling measurements and to link between the network backhauling performances and the mobile station's measurement results.

In a network whose base stations are mobile (as in a tactical military cellular communication network), network performance can change dramatically because there is no guarantee that backhauling performances may be kept in the new locations. Certain embodiments of the present invention relate to a network architecture based on relays that establish multi-hop routes via in-band backhauling. In this solution each relay has a standard mobile station (rMS) that carries the backhauling traffic. The rMS does not however typically have keyboard or display, and typically includes only the LTE (or WiMAX) modem.

Figure 2:
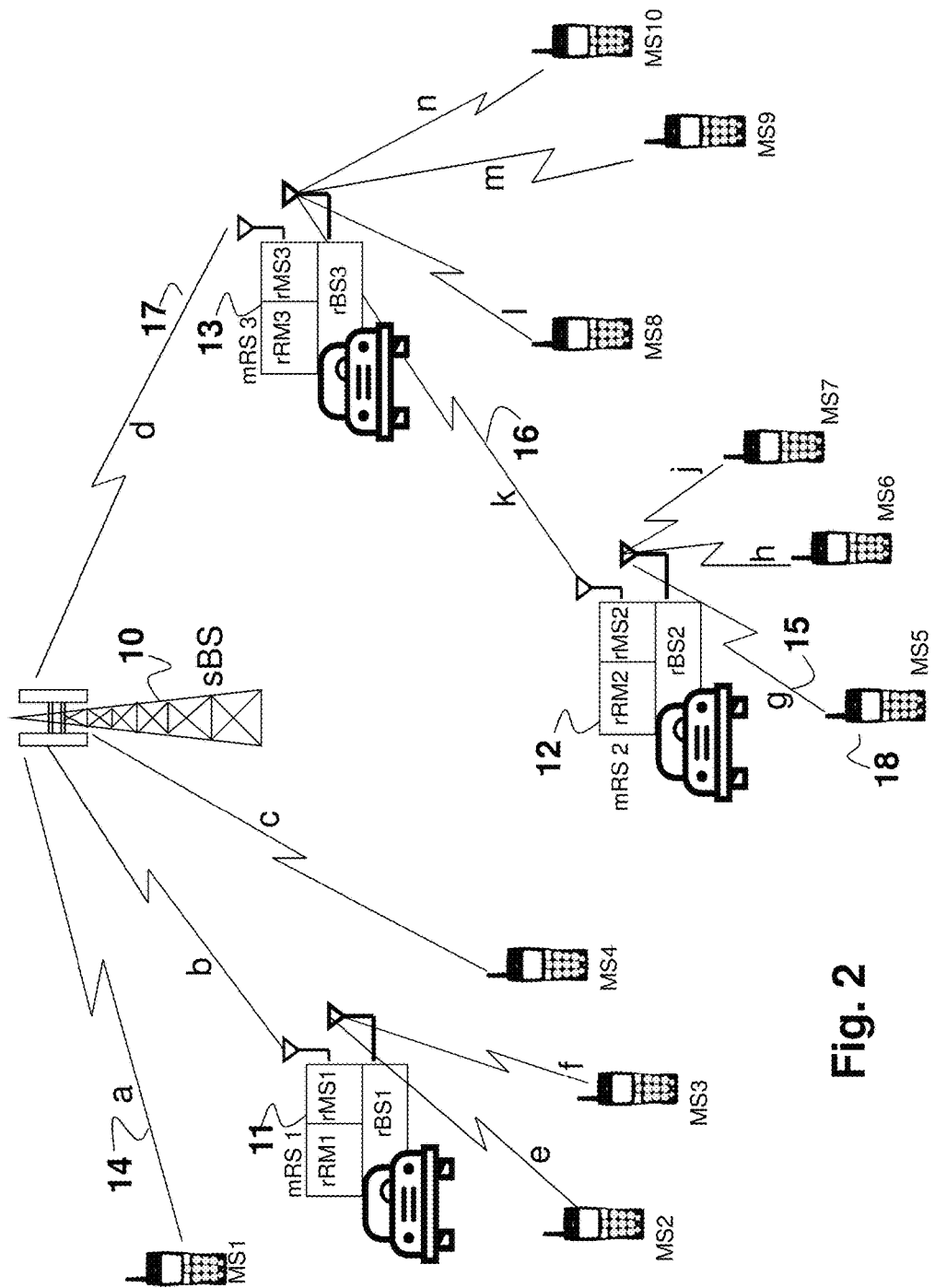
FIG. 2 is a simplified pictorial diagram of a mobile multi-hop cellular relay network in which its base stations are mobile.
Figure 8:
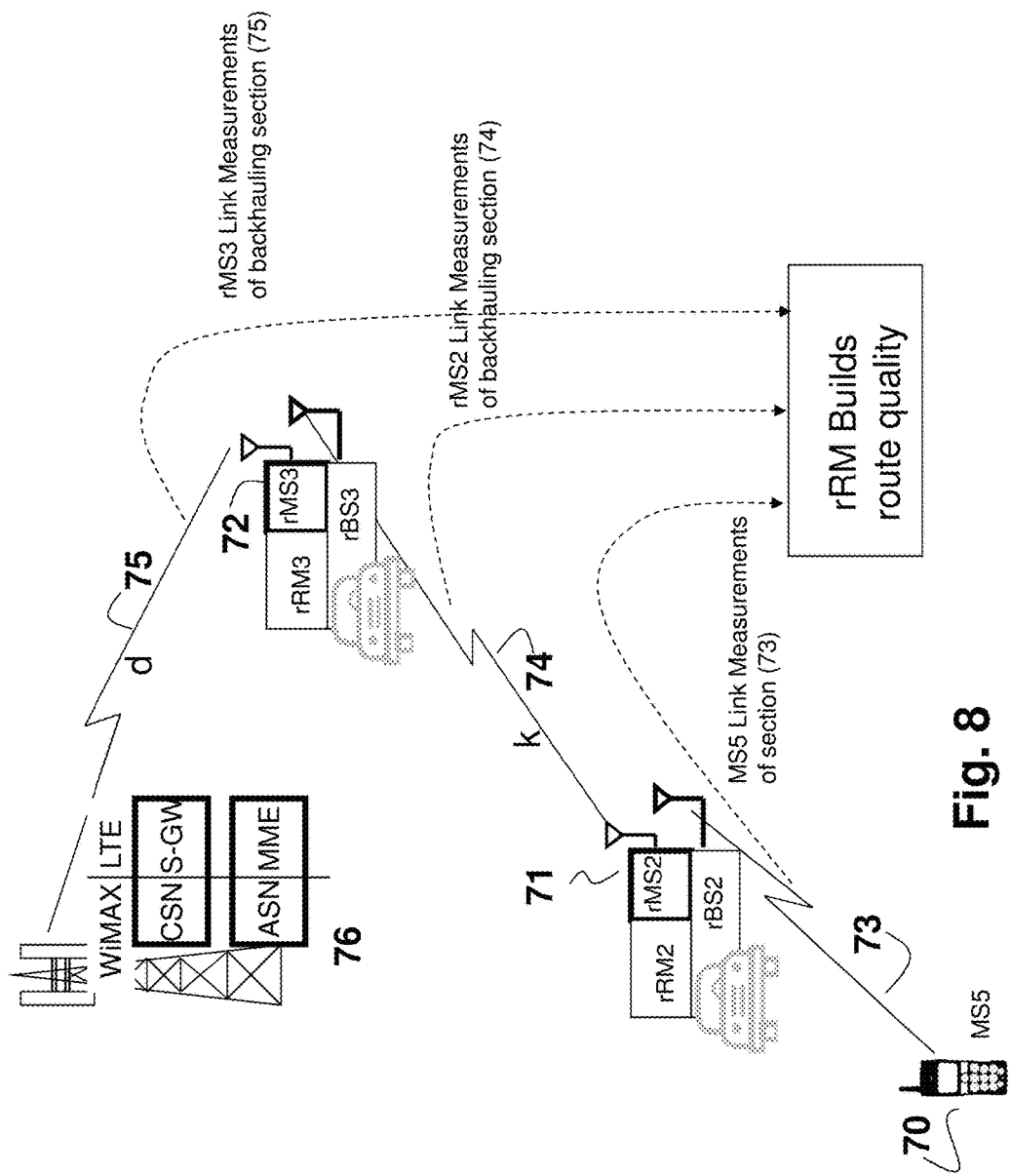
FIG. 8 is a simplified pictorial diagram of measurement aggregation in each route, in accordance with certain embodiments of the present invention.

This rMS is connected to base station (rBS) of another relay, which has its own rMS that is connected to another rBS of another relay. The messages that establish these connections are according to E-UTRAN (or WiMAX) standards. Such a route contains several sections. The quality of each radio section is measured by the rMS of this section and the quality of the whole route is an outcome of the quality measurement results of all the sections of each route, as depicted in FIG. 8. FIG. 2 depicts a network with 3 relays (11), (12), (13). Each relay functions as a base station (rBS) at its access side and as a mobile station (rMS) at its backhauling side. The rBS and rMS of each relay are controlled internally by the rRM—the relay Radio Manager. In the event that the rBS transmission interferes with the co-located rMS's attempts to be connected to the remote base station, the rRM may cause the rBS to transmit empty frames in the downlink.

According to an embodiment of the invention, decisions of RRM—Radio Resource Management, including but not limited to handover decisions or admission decisions about to which base station the mobile station will be connected to, or MS network entry decisions, are based on the quality measurements of all the sections that compose a route.

Each MS may have several routes to a static base station. Turning at first to FIG. 2 it can be seen that MS5 (18) can be connected to the sBS in the following routes:
  I. Through rBS1: This route contains sections: (36), (29)
  II. Through rBS2: This route contains sections: (37), (38), (39)

In the following example, the assumption is that MS5 can only measure the reference signals of rBS1(36) and rBS2 (37). MS5 does not have any information about the quality of sections (29), (38), (39) that are measured by rMS1 and rMS2, rMS3. Preferably, the rRM of each relay gathers this measurement information, relays it to the other rRMs in the network, and creates a Quality Grade Result (QGR) for each route according to this information. This QGR is transferred to the appropriate MS, which is MS5. The rRM decides about handover operation according to the QGR, and in idle mode, the MS can decide to which base station to be connected.

In order to form a QGR for each possible route, a Section Measurement Table (43) is generated e.g. as described in FIG. 4. In accordance with certain embodiments of the present invention, the method builds in each rRM a table as described herein with reference to FIG. 4.

All rRMs work on the same tables and data base mentioned above and the handover decision and admission methods may be the same in all rRMs. Therefore all rRMs get the same RRM handover decision and the rRM responsible for doing this process is the one that the MS camps on.

Each rRM bases its communication with the co-located rMS on messages that are defined by the standard, and, in addition, specific messages. In this manner it can control the local rMS and can request to perform link measurements.

Figure 3:
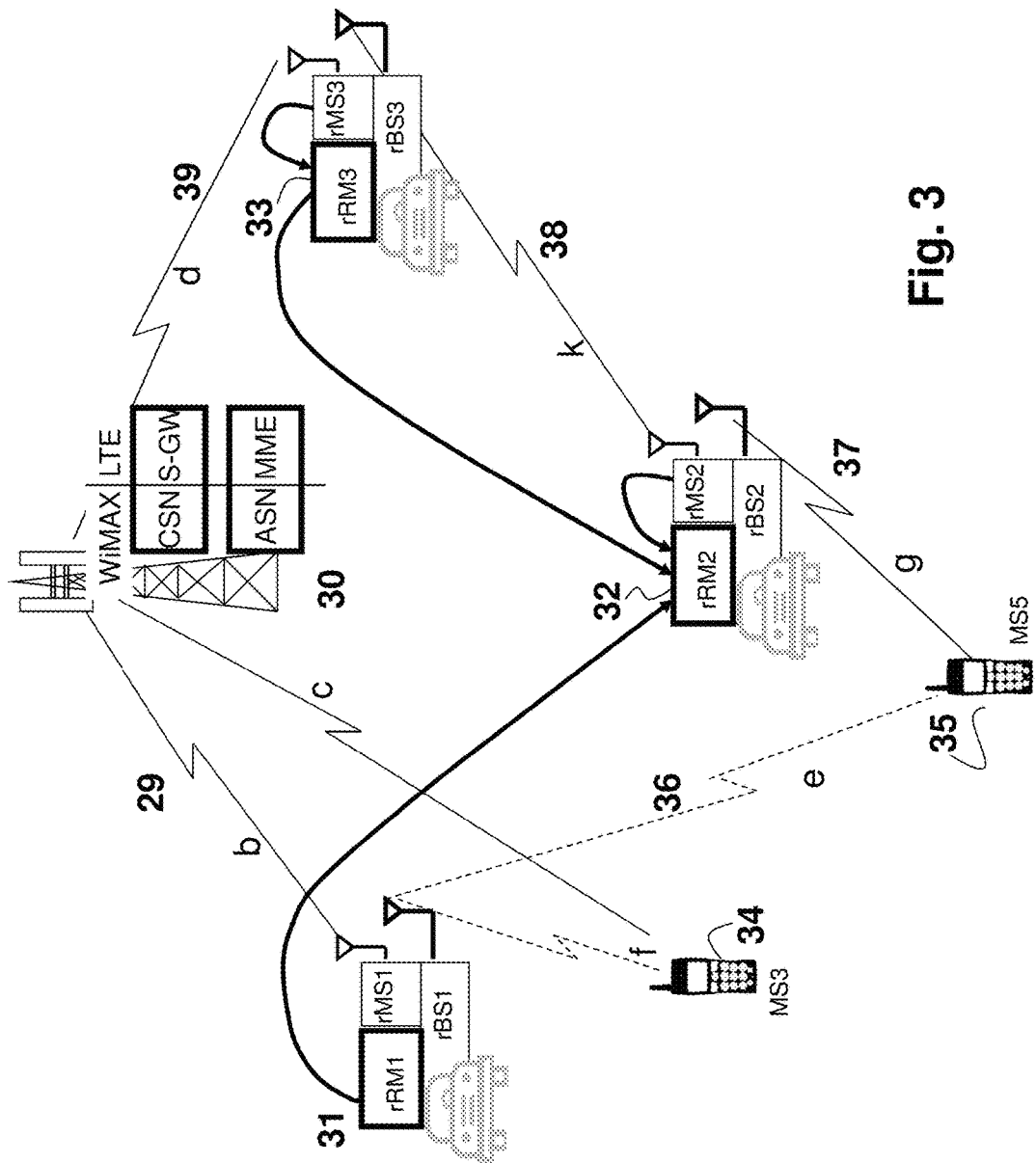
FIG. 3 is a simplified pictorial diagram of a rRMs communication network.

Each rRM communicates with the other rRMs through the rRM specific messages over the LTE-S1 or WiMAX-R4 protocols, as is depicted in FIG. 3. Regarding this embodiment, the rRM extracts the measurement report of its rMS and is responsible to transfer this measurement via a specific measurement report message to the other rRMs.

Figure 5:
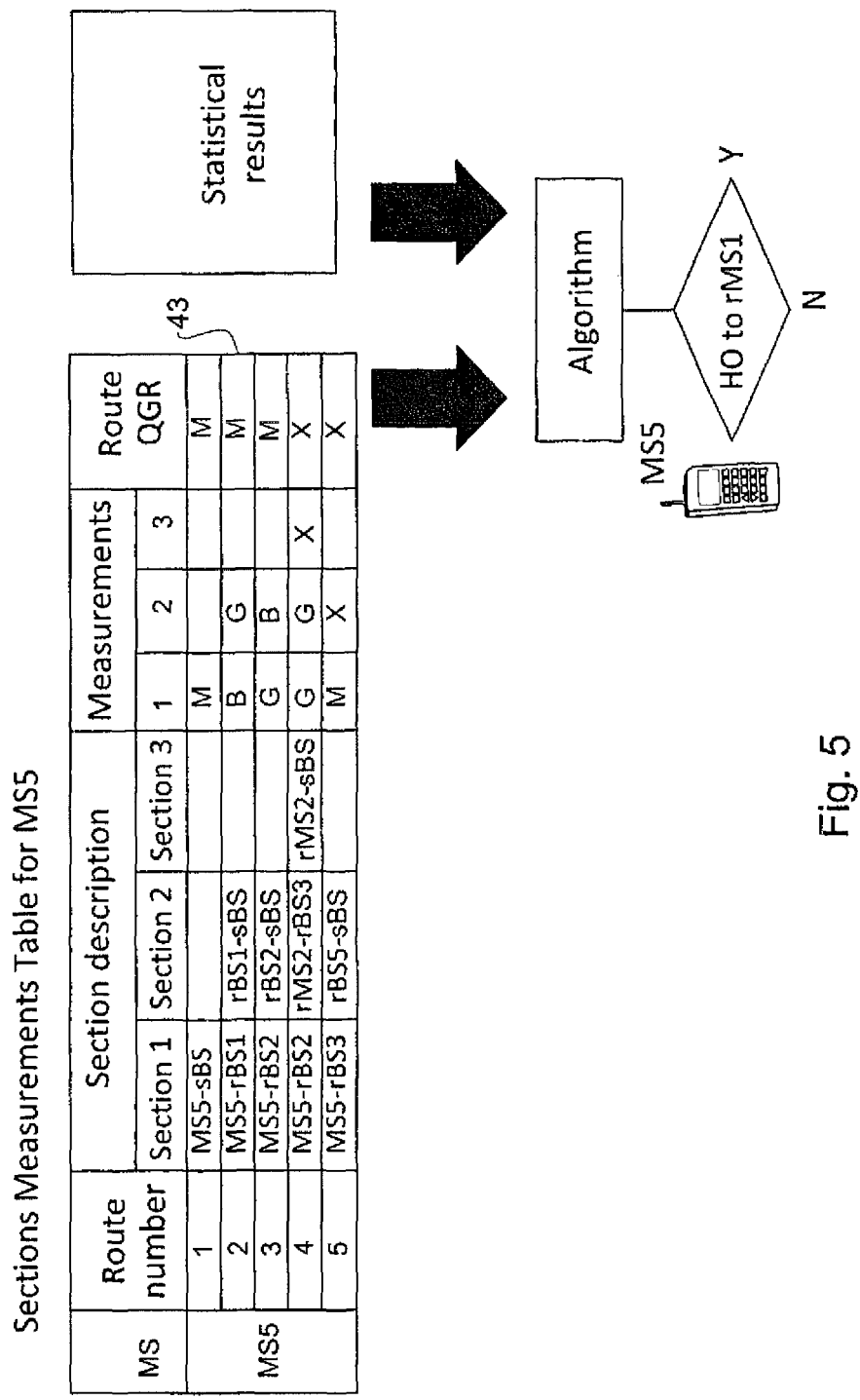
FIG. 5 is a simplified diagram showing how the Section Measurement Table provides input to the handover algorithm, in accordance with certain embodiments of the present invention.
Figure 11:
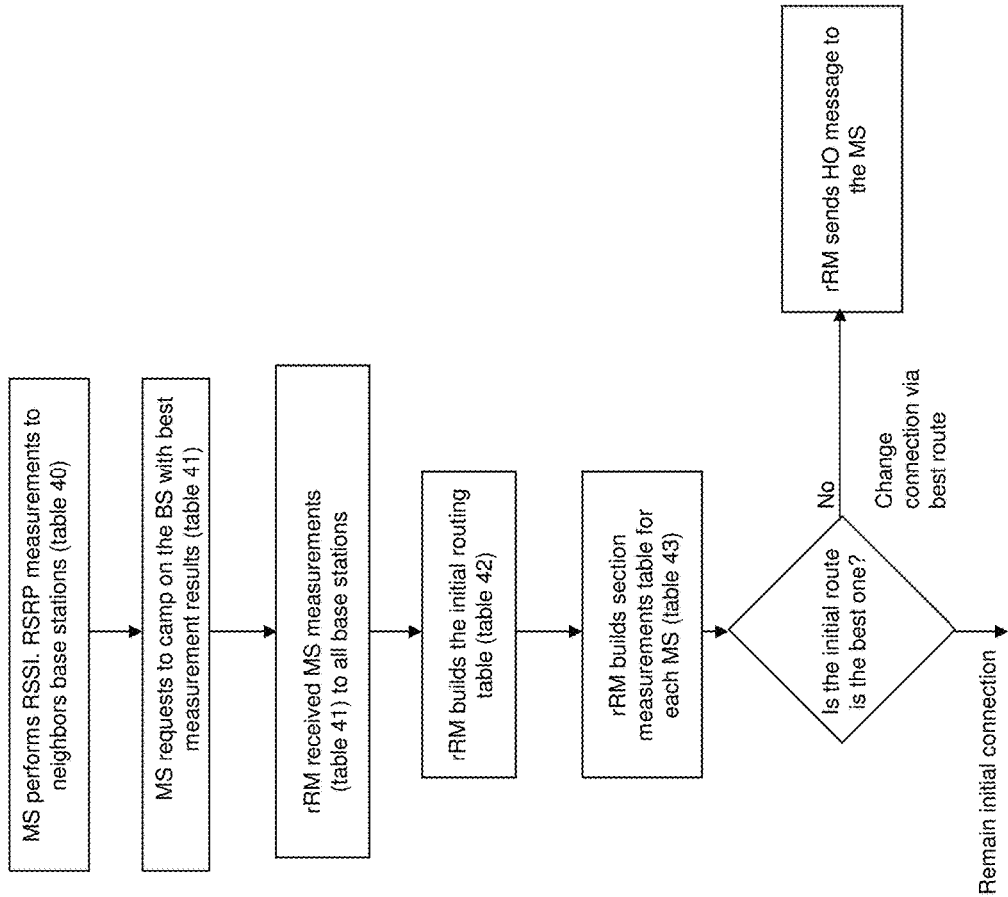
FIG. 11 is a simplified flowchart illustration of a method, operative in accordance with certain embodiments of the present invention, for building tables such as Basic measurement table; Connectivity table: Routing table; Sections Measurement Table which are useful in accordance with certain embodiments of the present invention.

Each rRM typically builds, e.g. as shown in FIG. 11, some or all of the following tables:

a. Basic measurement table: contains the measurements and quality result of each end user MS toward all the base stations that each MS has found. This rough material data is updated periodically. FIG. 4 describes this table (40) e.g. according to the FIG. 2 scenario.

b. Connectivity table: e.g. as depicted in FIG. 4 (41). It provides information regarding to which BS each mobile station is connected.

c. Routing table: e.g. as depicted in FIG. 4 (42), describes the actual routes and the sections that are related to this route.

d. Sections Measurement Table (STB); e.g. as depicted in FIG. 4 (43), is relevant because routing decisions are taken according to its parameters. It describes measurements that relate to each section of the actual connection route and a description of alternative routes as well. This table is the input to the handover decision making process, as illustrated in FIG. 5.

The left side of FIG. 4 describes the measurement results of the scenario of FIG. 2. The basic measurement table (40) describes the quality result (QGR) toward each base station that is discovered by the MS. The QGR is based on the RSRI, RSRP measurements and RSRQ result toward each BS.

$$RSRQ = N(RSRP/RSSI)(dB) \text{ where } N = \text{number of resource blocks.}$$

The connectivity table (41) provides information about the decision of each MS to which base station to be connected. In the initialization stage, the right side of FIG. 4 describes what the rRM sees. It can be seen in table (42) that the rRM of each relay has the quality results of each section in each actual route of each MS.

The Sections Measurement Table (SMT) provides the quality results of all possible routes of each mobile station. In FIG. 5 the table describes all possible routes of MS5 according to the scenario in FIG. 2. The Section Measurement Table is a data base employed by the rRM and the MS in deciding about handover and in deciding what base station to be connected to.

Each rRM has a list of MSs that camp on it and therefore has the capability to establish communication between them. For example, mRS2 (12) in FIG. 2 can establish complete communication traffic between MS5, MS6 and MS7. In addition to this, each rRM knows the connection of its local rMS and accordingly can establish communication between the MSs that camp on it and the MSs of the relay in which its rMS is connected. For example, if in FIG. 2 link g between mRS 3 and sBS is disconnected or of poor quality, rRM2 can still establish communication between MS5-MS10.

Figure 9:
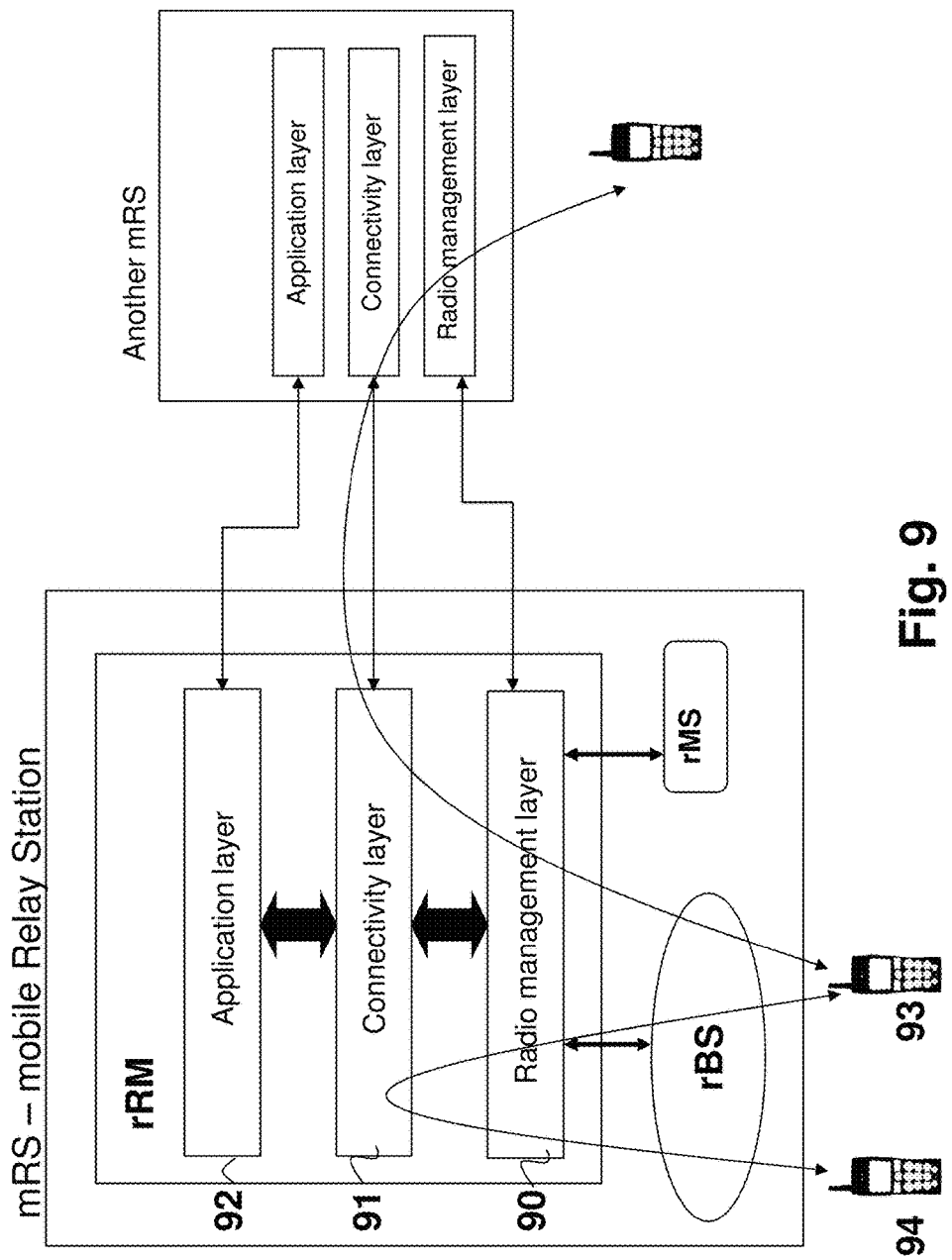
FIG. 9 is a simplified semi-block diagram semi-pictorial diagram of the silence mode of rBS, operative in accordance with certain embodiments of the present invention in which a moving base station observes a silence period during which it refrains from transmitting to its own co-located mobile station, e.g. such that at least one characteristic of the silence period, such as a zone in which silence is observed which is defined over at least one of a frequency band and a time window, is dynamically determined by the moving base station's co-located radio manager.
Figure 10:
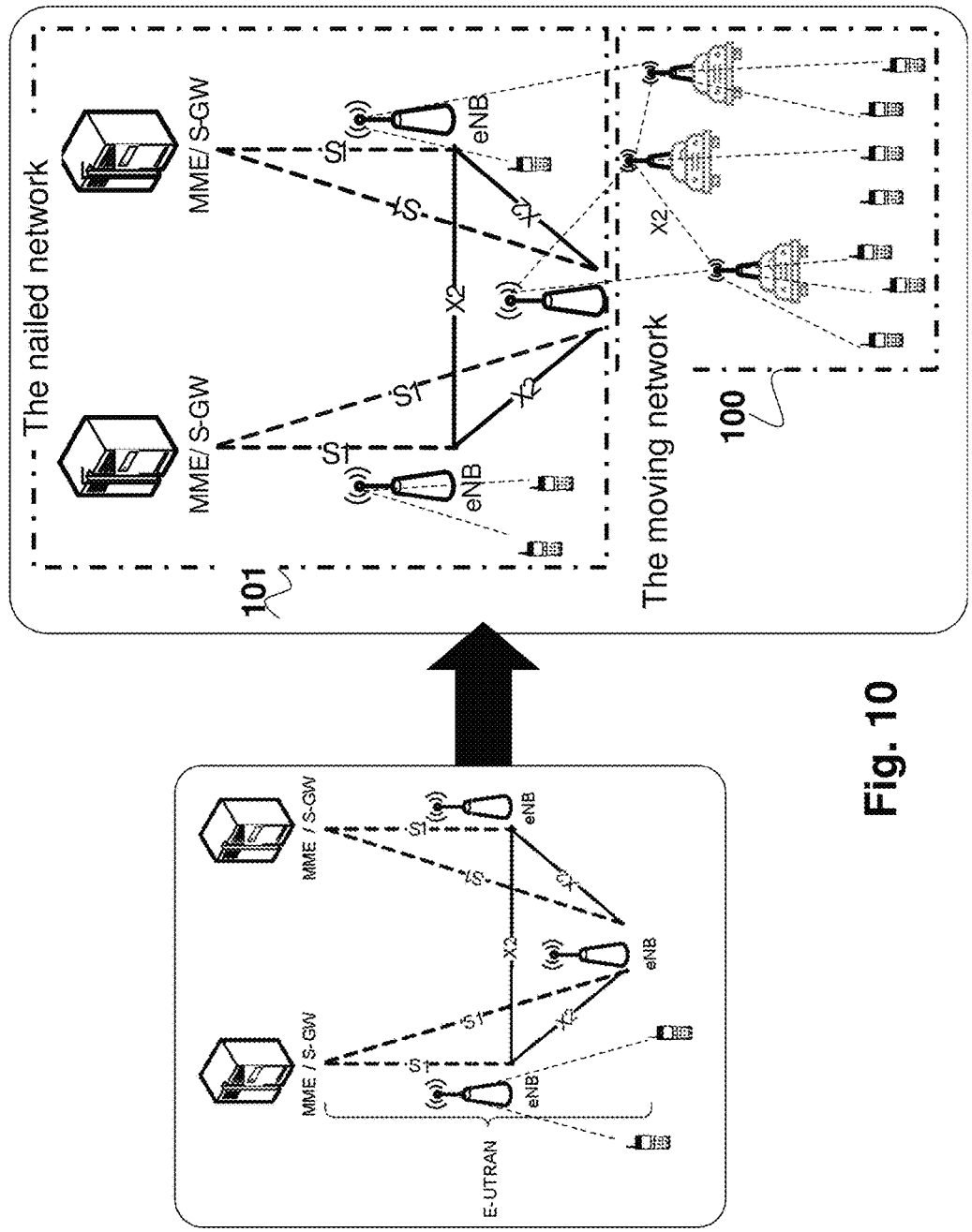
FIG. 10 is a simplified block diagram illustration of an E-UTRAN multi-hop relay network constructed and operative in accordance with certain embodiments of the present invention.

The rRM typically includes several layers, as illustrated in FIG. 9. Typically, the radio management is typically carried out in the radio management layer (90) whereas the capability to establish the connection between end users' mobile phones (MSs) is carried out by the service layer of the rRM (91). The application layer of the rRM (92) is above its service layer and provides specific radio management applications for the tactical network.

In tactical networks, it happens that the quality of the backhauling section, due to mobility, may change dramatically while the relay is on the move from one location to another. The application layer of the rRM ties the connectivity of the relay (QGR) to the actual location point at which it was measured. This allows a person who carries and uses the relay to have an indication of location points which have good QGR.

In a 3 hop situation, in which one mobile relay is connected to the static base station (sBS) via another relay, the application layer of the first mobile relay (12) may send a message to the other relay (13) to find a best place for backhauling and may stay there.

The method for handover or network entry can be performed by the network or the mobile station (MS). In cases where the decisions re handover and network assignment are made by the MS, the Section Measurement Table (STB) in FIG. 5 is transferred over the application layer to the relevant MS. A handover decision making method provided in accordance with certain embodiments of the invention is now described. The method typically provides Quality Grade Result (QGR) for each possible route. Mobile stations (MS) can be connected directly to the main/fixed BS, or via one or two relays in one hop or two. For example, MS1 in FIG. 2, is connected directly to the main sBS while MS2 is connected via mobile relay 1 (mRS1) and MS5 is connected via mRS2 and mRS3. In such a case, to ensure connectivity and maintain quality of service and desired user bit rate, it is important that the decision for handover and other RRM operations may not depend just on the RSRP, RSSI and RSRQ measurements of the end user MS only, but also on the measurements done by the rMSs belonging to this link. The method by which the rRM makes a decision for handover operation may be based on the measurements of the MS and the measurements of the rMSs that are part of this specific backhauling link. For example, MS4 in the Section Measurement Table in FIG. 5 can be connected via the sBS or RBS1 or RBS2. In each of these 3 routes the measurements of each sector (meaning the measurements of MS4, rMS2 and rMS3) are taken into consideration.

From a mobile station point of view, there are several use cases that are related to connectivity:

The MS does not see any of the base stations
The MS sees one base station that is a relay BS (rBS)
The MS sees one base station that is a standard BS (sBS)
The MS sees several base stations that can be a combination of rBS and sBS In each of these cases there are several levels of quality grades (QGR), which are related to each base station reception. The presumption at this stage is that they are either good, medium or poor.

Good quality means that RSRQ≥Threshold 1 that enables to transfer up to 64 QAM Medium quality means that RSRQ≥Threshold 2 that enables to transfer up to 16 QAM Poor quality means that RSRQ≤Threshold 3 in which the connection could not be established in the minimum requested quality.

Each mobile station (MS) or relay MS (rMS) sees only "one layer" of base stations and its measurements relate to this layer only. In order to get a right handover or network entry decision, the algorithm preferably relates to the measurements of all the layers.

The criteria of the MS for base station selection is done according to MS measurements, as defined in the LTE standard (TS 36.304). The cell selection criterion S is fulfilled when:

Srxlev>0
Where:

$$S_{rxlev} = Q_{rslevmeas} - (Q_{rxlevmin} + Q_{rxlevminoffset}) - P_{Compensation} \text{ [dB]}$$

where $P_{Compensation} = \max(P_{EMAX} - P_{UMAX}, 0)$ [dB]

Qrxlevmeas is the measured receive level value for this cell, i.e. the Reference Signal Received Power (RSRP) as defined in the standard. This measured value is the linear average over the power of the resource elements that carry the cells' specific reference signals over the considered measurement bandwidth. Consequently, it depends on the configured signal bandwidth. In the case of Receiver's diversity configured for the MS, the reported value may be equivalent to the linear average of the power values of all diversity branches.

Qrxlevmin is the minimum suitable receive level in this cell, given in dBm. This value is signaled as Q-RxLevMin by higher layers as part of the System Information Block Type 1 (SIB Type 1). The Qrxlevmin computation is based on the value provided within the information element (−70 and −22) multiplied with factor 2 in dBm.

Qrxlevminoffset, is an offset to Qrxlevmin that is only taken into account as a result of a periodic search for a higher priority PLMN while camped normally in a Visitor PLMN (VPLMN). This offset is based on the information element provided within the SIB Type 1, taking integer values between (1 . . . 8) also multiplied by a factor of 2 in dB. This gives a wider range by keeping the number of bits transmitting this information. The offset is defined to avoid "ping-pong" between different PLMNs. If it is not available then Qrxlevminoffset is assumed to be 0 dB.

PCompensation is a maximum function as shown in Equation 5. Whichever parameter is higher, PEMAX-PUMAX or 0, is the value used for PCompensation. PEMAX [dBm] is the maximum power a MS is allowed to use in this cell, whereas PUMAX [dBm] is the maximum transmit power of an MS according to the power class the UE belongs to. Only one power class is defined for LTE, which corresponds to Power Class 3 in WCDMA that specifies +23 dBm. PEMAX is defined by higher layers and corresponds to the parameter P-MAX defined in the standard. Based on this relationship, PEMAX can take values between −30 to +33 dBm. Only when PEMAX>+23 dBm PCompensation is considered when computing Srxlev. The P-MAX information element (IE) is part of SIB Type 1 as well as in the RadioResourceConfigCommon IE, which is part of the SIB Type 2.

As explained above, all the parameters except for Qrxlevmeas are provided via system information. In a real network a MS may receive several cells perhaps from different network operators. The MS only knows after reading the SIB Type 1 if this cell belongs to its operator's network (PLMN5 Identity). First the UE may look for the strongest cell per carrier, then for the PLMN identity by decoding the SIB Type 1 to decide if this PLMN is a suitable identity. Following this, it computes the S criterion and decides whether it is a suitable cell or not.

Handover decision per end-user MS may be performed according to the quality grade of each actual route in comparison to the alternative route of this end user (MS), and may include some or all of the following steps, suitably ordered e.g. as shown:

a. If the MS has one route only, it may be considered as high risk MS and continue to be connected to this route.

b. In cases where there are several alternatives, each route section is checked separately. The QGR is checked and if there is a very poor QGR result, the route may be ignored and considered as a route without backhauling.

c. In cases where that there are several routes in which all sections are above the minimum QGR threshold, a comparison is done between them. The minimum QGR section in each route is taken and compared with the minimum QGR of each alternative route.

d. Handover decision takes place if the existing route has quality grade inferior to that of other routes.

Figure 6:
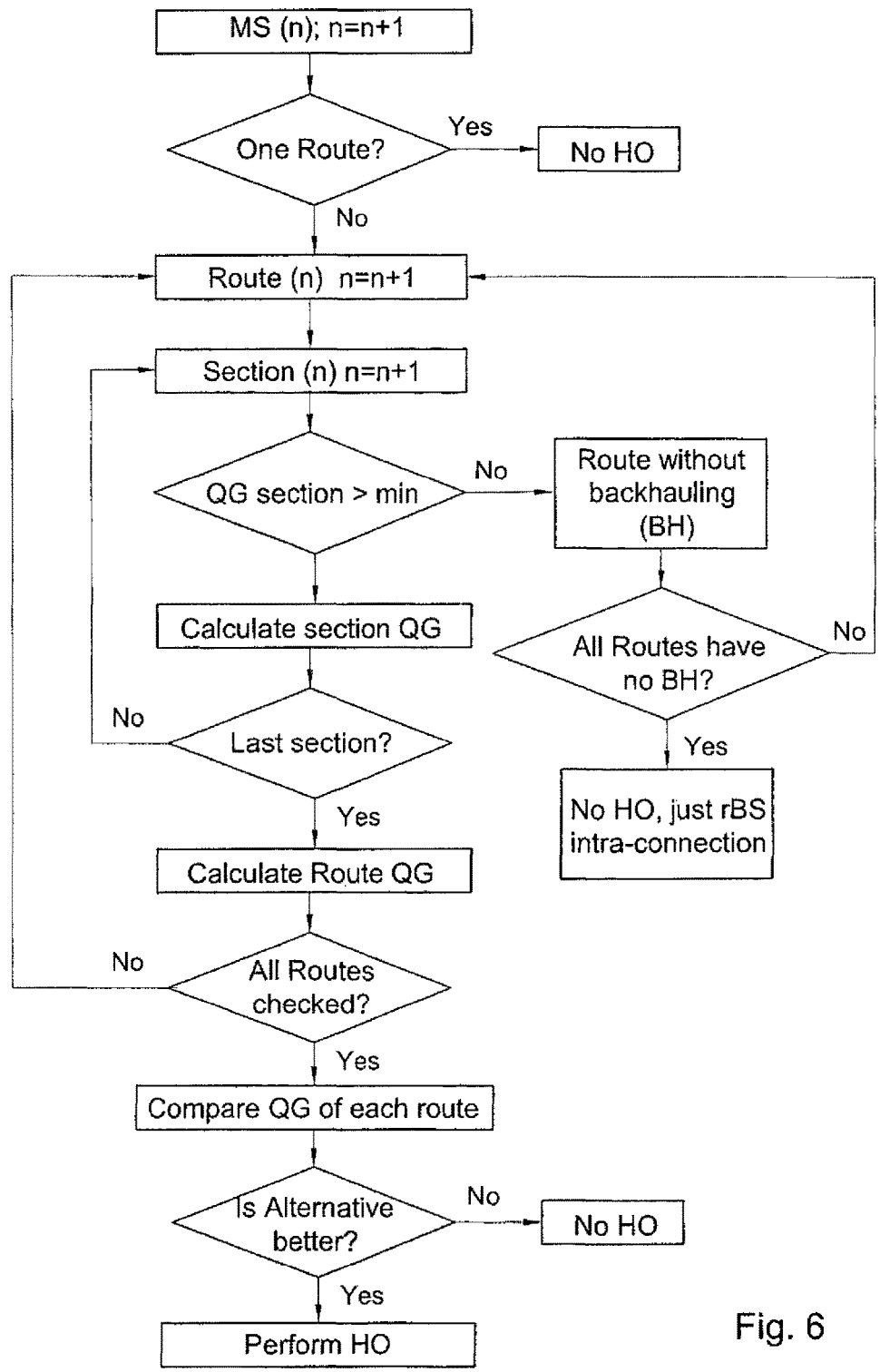
FIG. 6 is a simplified flowchart illustration of a cellular communication management functionality constructed and operative in accordance with certain embodiments of the present invention.
Figure 7:
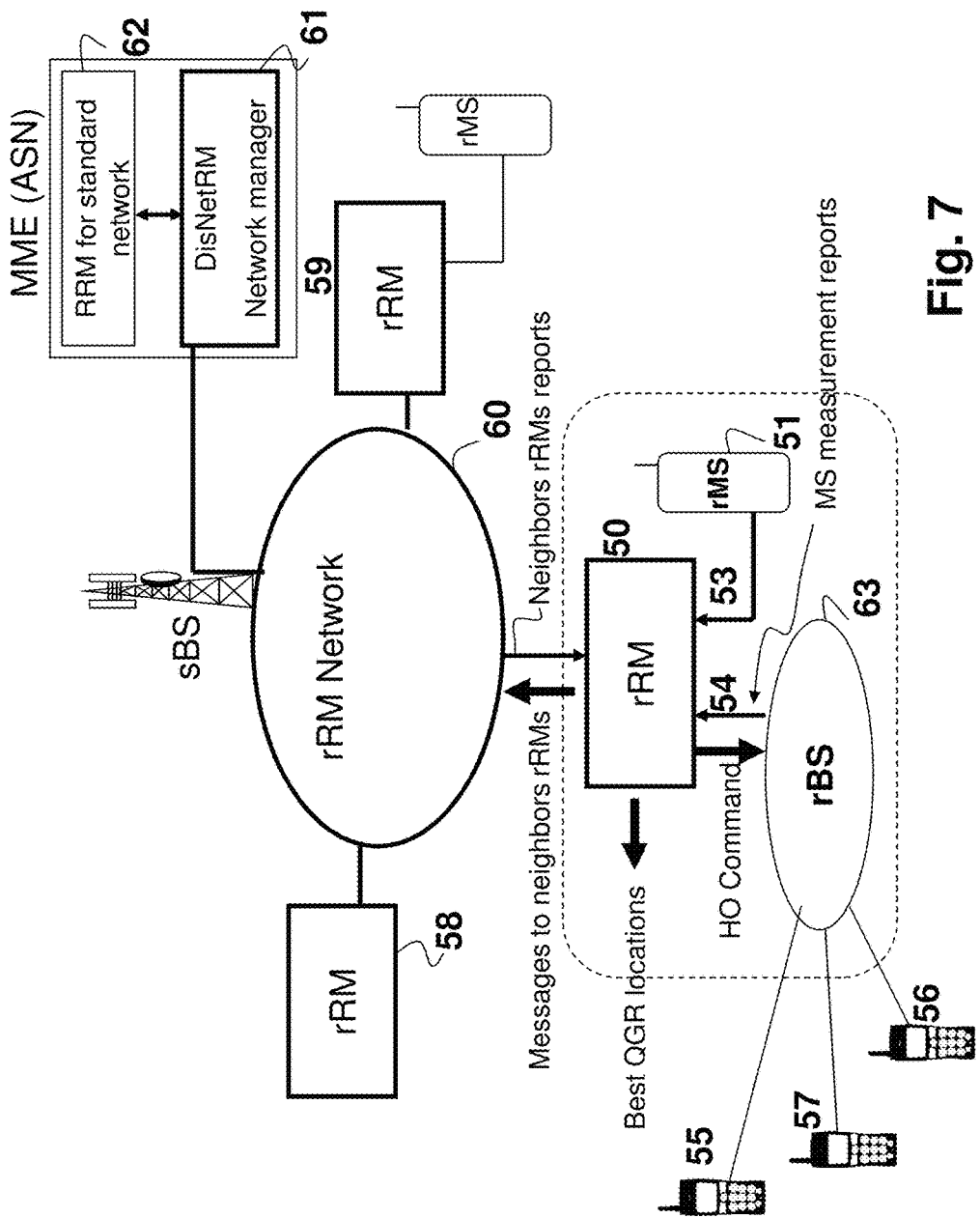
FIG. 7 is a simplified semi-pictorial semi-block diagram illustration of a centralized and distributed management scheme and associated rRM network, all constructed and operative in accordance with certain embodiments of the present invention.

FIG. 6 depicts a flow diagram of a handover method operative in accordance with certain embodiments of the present invention.

As described previously, typically, each relay has a standard mobile station (rMS) that carries the backhauling traffic; however the rMS typically does not include keyboard or display, but rather only an LTE (or WiMAX) modem. This rMS is connected to base station (rBS) of another relay, which has its own rMS that is connected to another rBS of another relay. In the event that the rBS transmission interferes with the co-located rMS's ability to be connected to the remote base station, the rRM may cause the rBS to transmit empty frames in the downlink.

As described above, each rRM typically builds some or all of the following tables: Basic measurement table; Connectivity table: Routing table; Sections Measurement Table. A suitable method for building these tables is depicted in FIG. 11. The Section Measurement Table may be employed as a data base by the rRM and the MS to decide about handover and the base station to which to be connected.

As described above, each rRM has a list of MSs that camp on it and therefore has the capability to establish communication between them. For example, mRS2 (12) in FIG. 2 can establish complete communication traffic between MS5, MS6 and MS7. In addition to this, each rRM knows the connection of its local rMS and accordingly can establish communication between the MSs that camp on it and the MSs of the relay in which its rMS is connected. For example, if in FIG. 2 section d(17) between mRS 3 and sBS is disconnected or in poor quality, rRM2 can still establish communication between MS5-MS10. The rRM has several layers, e.g. as depicted in FIG. 9. Typically, while radio management is effected in the radio management layer (90), the capability to establish the connection between end users mobile phones (MSs) is effected by the service layer of the rRM (91). The application layer of the rRM (92) is above its service layer and provides specific radio management applications for the tactical network.

In tactical networks, it may occur that the quality of the backhauling section, because of mobility, may be changed dramatically while the relay moves from one place to another. The application layer of the rRM ties the connectivity of the relay (QGR) to the actual location point it was measured. This affords persons who carry and use the relay an indication regarding location points that have good QGR.

In case of 3 hops meaning one mobile relay is connected to the static base station (sBS) via another relay, the application layer of the first mobile relay (12) may send a message to the other relay (13) to find the best place for backhauling and stay there.

As described above, a Decision making method is provided herein which provides a Quality Grade Result (QGR) for each possible route. Usually in MANET—Mobile Ad-Hoc Networks—algorithms are based on hop count (like the DSR) but these algorithms do not ignore weak quality links. According to certain embodiments of the present invention, the method may be based on a suitable modification, as described below, of the following algorithm: Fuad Alnajjar and Yahao Chen, "SNR/RP aware Routing Algorithm Cross—Layer Design for MANET" (IJWMN, Vol 1, No 2, November 2009), which is based on SNR and power measurements. The Alnajjar-Chen method is typically modified in some or all of the following respects:

1) the report generated may merely include the conventional contents of a E-UTRAN measurement report of the mobile stations (NMR). There is no Route Request message and Replay message.

2) Computation of the route quality is not done in the source node—the mobile station, but in the intermediate nodes—the relay rRM.

3) In addition to the RSSI, RSRP metrics (like the SNR and power in the Alnajjar article) there are statistical STD, average/mean and median metrics that weight the results of each section (e.g. as described herein with reference to FIG. 5). If the relay is on the move and its SNR measurements are changing (large STD) it degrades section quality.

In tables 40, 41, 42 and 43 shown in FIGS. 4-5, the QGR—Quality Grade Result has 3 quality values: G-good, M-medium, B-bad. These values are combination of the SNR and the statistical metrics. The SNR is the minimum SNR that is needed for modulation constellation according to the 3GPP E-UTRAN tables.

The E-UTRAN defines an RSRQ parameter which is similar to the SNR:

$$RSRQ = \frac{N \times RSRP}{RSSI}$$

N=Number of Resource blocks
RSRP—Reference Signal Received Power
RSSI—Received Signal Strength Indicator
RSRQ—Reference Signal Received Quality
This formula may be modified as follows:

$$rsSINR = \frac{N \times RSRP}{RSSI - N \times RSRP}$$

$$rsSINR = \frac{1}{\frac{1}{RSRQ} - 1}$$

rsSINR=reference signal SINR

In addition, statistical parameters e.g. mean or other measure of central tendency, and/or standard deviation as below may be computed and may be suitably combined, using a suitable application-specific combining method, with the above information to generate a highly representative channel quality grade result:

Mean:

$$E = \frac{1}{N}\sum_{i=1}^{N} rsSINR(i)$$

Standard deviation:

$$S = \frac{1}{N}\sum_{i=1}^{N} (rsSINR(i) - E)^2$$

For example, in the field, it may transpire that given a fairly large standard deviation, a lower total grade should be allocated, if the fluctuation indicated by the large standard deviation is found in preliminary field experiments to frequently (a large percentage of the time) yield unacceptably poor SNR in certain communication segments.

Finally, define the two criteria parameter figures: $\Delta_1$ and $\Delta_2$ ($0<\Delta_1<\Delta_2$). Using those criteria parameters, determine the QGR e.g. using the following two conditions:

$$\begin{cases} E > SNR_{req}(1 + \Delta) \\ \frac{2S}{E} \leq \Delta \end{cases}$$

If both conditions apply for $\Delta=\Delta_1$ then the QGR is G (good), else if they apply only for $\Delta=\Delta_2$ then the QGR is M (medium) else the QGR is B (bad). All these QGRs are associated with a certain transmission mode (modulation and coding). Typical values for the criteria are $\Delta_1=0.1$ and $\Delta_2=0.5$. If $\Delta$ is close to 0, the STD of the signal is very small and its average is close (upper side) to the threshold SNR so no extra margin is apparent hence the situation is good.

Figure 12:
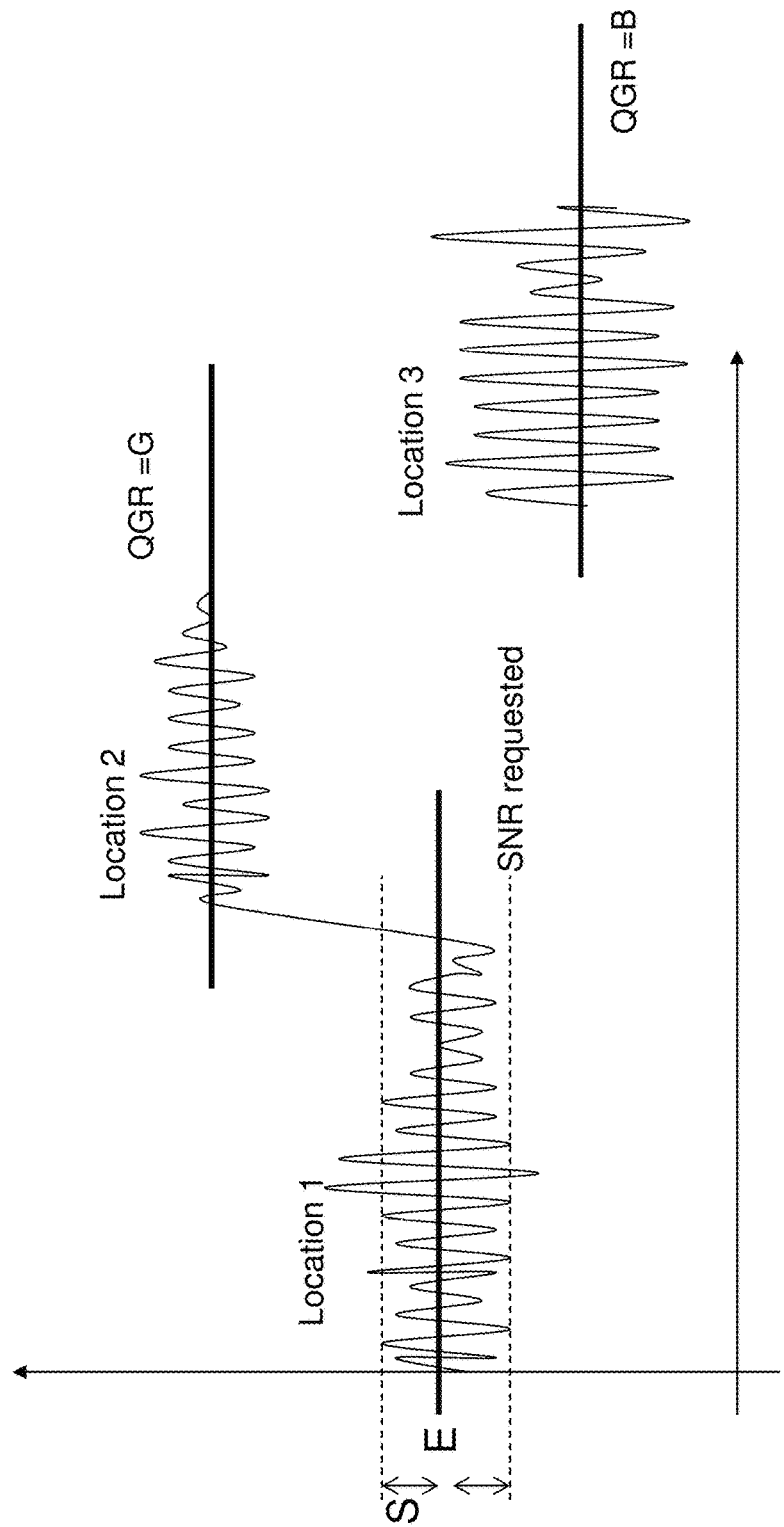
FIG. 12 is a graph of SNR vs. time useful in understanding certain embodiments of the present invention.

FIG. 12 graphs the above parameters. As shown, if E is high, large S is acceptable whereas if E is low (margin SNR), the standard deviation E is preferably low as well.

Figure 13:
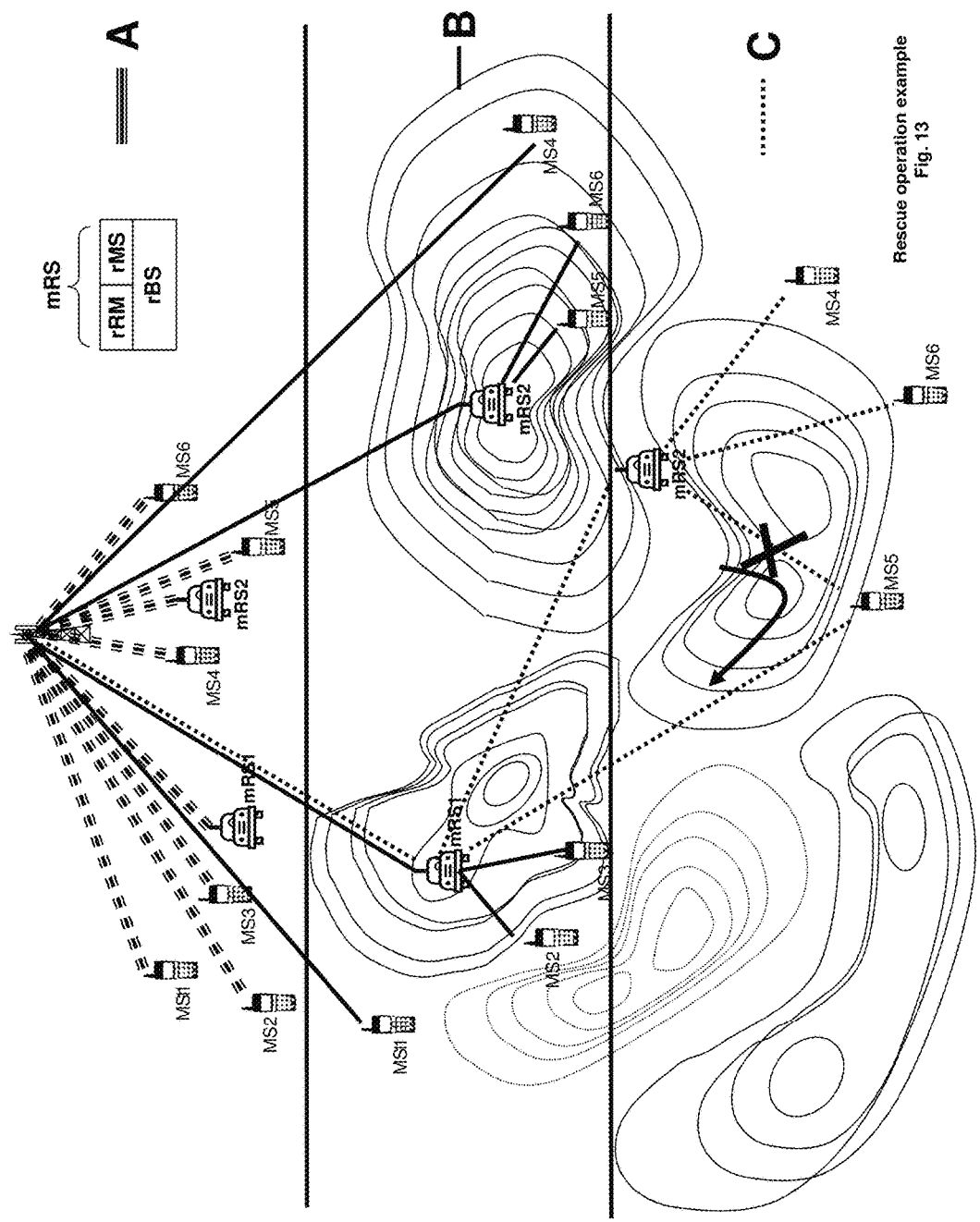
FIG. 13 is a pictorial illustration of an example of a rescue operation in which various mobile stations and moving base stations, serving medical personnel, are advancing over a terrain where they may never have been deployed, e.g. toward a disaster area.

FIG. 13 is a pictorial illustration of an example of a rescue operation in which various mobile stations and moving base stations, serving medical personnel, are advancing over a terrain where they may never have been deployed, e.g. toward a disaster area. It is appreciated that the relevant features of the terrain may include, instead of or in addition to the topographical features shown, other features such as flora and/or urban fixtures either of which may disrupt communication between communication network nodes.

Each mRS typically has co-located rRM functionality, rMS functionality and rBS functionality, as shown. A first state of the system is shown as stage A; communication lines are indicated by a triple line. A second state of the system is shown as stage B; communication lines are indicated by a solid line. A third state of the system is shown as stage C; communication lines are indicated by a dotted line. As shown, in stage A all the MSs are conventionally connected to the sBS. However, in stage B the forces move forward. MS1 and MS4 are still camped on the sBS whereas all other mobile stations get communication services via mRS1 and mRS2. More generally, according to certain embodiments, service is provided by sBS1 when possible; this is termed "the central approach".

In stage C the forces on the right side have moved forward. mRS2 is in a valley and has connection with mRS1 but no connection with the sBS. The STB table, as shown in FIG. 14, shows rRM2 and MS5 that the preferable route is via mRS2 and therefore the communication route for MS5 is changed accordingly, as shown. In idle mode, MS5 may make this decision whereas if MS5 is in active session, or is occupied with other network transactions, the decision may be made and initiated by rRM2.

FIG. 14 shows how the tables described herein support the decisions made in the example of FIG. 13. As shown, the tables show that in stage C, MS5's MS connectivity decision, rBS2, is wrong. The section measurement table for MS5, however, indicates how to rectify the situation: MS5 may be connected to rBS1.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively; be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting. Flowcharts included herein are used for simplicity to exemplify methods typically comprising some or all of the steps shown, suitably ordered e.g. as shown.

The invention claimed is:

1. A mobile communication network system operative in conjunction with a core network including a core device and at least one static base station, the system operative in conjunction with a plurality of base stations; and
a population of mobile stations communicating via antennae with the base stations;
the system comprising:
at least one moving base station which communicates via antennae with the mobile stations and includes base station functionality, a first radio manager and mobile station functionality all co-located with the base station functionality,
the base station functionality having a physical back-connection to the first radio manager, the first radio manager having a physical connection with the mobile station functionality, the mobile station functionality communicating via antennae with at least one selectable static base station,
wherein the first radio manager comprises:
a radio resource manager; and
functionality for receiving information from, and sending information to, other radio managers, respectively co-located with other moving base stations, and for using the information received from other radio managers to determine whether to reject at least one mobile station seeking to be served by an individual base station associated with the individual co-located radio manager, wherein the information used to determine whether to reject includes at least one of the following:

location of said at least one moving base station; and statistics regarding measurements of link quality, wherein said information received from other radio managers and used to determine whether to reject comprises information regarding qualities of respective connections of respectively co-located radio managers back to the core network, wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information, and wherein said parameter characterizing route quality is a combination of measured qualities of route sections and fluctuations thereof such that route sections with larger fluctuating quality measurements are devalued due to their unpredictability relative to route sections with smaller fluctuating quality measurements.

2. The system according to claim 1 wherein said information received from other radio managers and used to determine whether to reject provided by respectively co-located radio managers via a selected one of:

a static base station from among the at least one static base station of the core network; and a moving base station capable of providing service to the individual radio manager's co-located mobile device.

3. The system according to claim 1 wherein said information regarding quality of its own connection back to the core network is provided by its own co-located mobile station.

4. The system according to claim 1 wherein said information includes information regarding channel quality which other base stations are able to provide mobile stations in the vicinity of the individual co-located radio manager and which is provided by reports generated by said mobile stations in said vicinity.

5. The system according to claim 1 wherein said information regarding quality of service available from its own base station for mobile stations in the vicinity of the individual co-located radio manager is provided by its own co-located mobile station.

6. The system according to claim 1 wherein said individual mobile station is operative to select a base station to be connected to at least partly based on said information indicative of said route comparison information.

7. The system according to claim 6 wherein said parameter is based upon a minimum SNR (signal noise ratio) value, over sections which together compose a route, each section having its own SNR (signal noise ratio) value.

8. The system according to claim 1 wherein at least one individual co-located radio manager includes a mobile-to-mobile direct communication facilitation functionality operative to provide direct communication, not requiring said core network, between a plurality of mobile devices in said individual radio manager's vicinity.

9. The system according to claim 1 wherein said moving base station observes a silence period during which it refrains from transmitting to its own co-located mobile station.

10. The system according to claim 9 wherein at least one characteristic of said silence period is dynamically determined by the moving base station's co-located radio manager.

11. The system according to claim 10 wherein said characteristic comprises a zone in which silence is observed which is defined over at least one of a frequency band and a time window.

12. The system according to claim 1 wherein said network comprises a tactical E-UTRAN network.

13. The system according to claim 1 wherein if a multi-hop communication route is used, in which a relay R that is connected to the core network via another relay A, relay R sends a message to a backhauling relay that R is A's anchor.

14. The method according to claim 13 wherein the backhauling relay becomes aware that another relay is connected to it and finds a location which has a good Quality Grade Result at which to remain.

15. The system according to claim 1 wherein said static base station is co-located with said core device.

16. The system according to claim 1 wherein said physical back-connection comprises an Ethernet back-connection.

17. The system according to claim 1 wherein said radio resource manager comprises an E-UTRAN radio resource manager.

18. The system according to claim 1 wherein users are shown a location which has a good Quality Grade Result (QGR).

19. The method according to claim 18 wherein statistical measurements of a co-located MS in each at least one relay are attached to location results of the relay and wherein said system includes at least one rRM having a functionality that computes and indicates to the user locations with good QGC (quality grade control).

20. The system according to claim 1 wherein said information includes information regarding qualities of other base stations' respective connections back to the core network.

21. The system according to claim 20 wherein said other base stations include all base stations along a route connecting said moving base station and said core, via which route said core serves said moving base station.

22. The system according to claim 1 wherein said information includes information regarding quality of the first radio manager's moving base station's connection back to the core network.

23. The system according to claim 1 wherein said information includes information regarding channel qualities which said first radio manager's own base station, and base stations other than said first radio manager's own base station, are respectively able to provide, to mobile stations in the vicinity of the first radio manager.

24. The system according to claim 1 wherein the information used to determine whether to reject includes location of said at least one moving base station; and statistics regarding measurements of link quality.

25. The system according to claim 24 wherein said at least one moving base station B is operative to reject at least one mobile communication device D if the moving base station B knows other moving base stations are currently better connected back to the core than B whereas B is currently poorly connected back to the core or not connected at all, hence device D can do better elsewhere.

26. The system according to claim 1 wherein at least one radio manager is (a) operative for receiving information from other respectively co-located radio managers regarding:

qualities of other respectively co-located radio managers' respective connections back to the core network, quality of the individual co-located radio manager's own connection back to the core network channel quality which other base stations are able to provide to mobile stations in the vicinity of the individual co-located radio manager channel quality which the individual co-located radio manager's own base station is able to provide to mobile stations in the vicinity of the individual co-located radio manager, thereby to provide statistics regarding measurements of link quality, and (b) is also operative for sending the above information to other respectively co-located radio managers.

27. The system according to claim 26 wherein said at least one moving base station B is operative to reject at least one mobile communication device D if the moving base station B knows other moving base stations are currently better connected back to the core than B whereas B is currently poorly connected back to the core or not connected at all, hence device D can do better elsewhere.

28. The system according to claim 1 wherein said at least one moving base station B is operative to reject at least one mobile communication device D if the moving base station B knows other moving base stations are currently better connected back to the core than B whereas B is currently poorly connected back to the core or not connected at all, hence device D can do better elsewhere.

29. A mobile communication networking method comprising:
providing a core network including a core device and at least one static base station; a plurality of base stations; and a population of mobile stations communicating via antennae with the base stations;
the base stations including at least one moving base station which communicates via antennae with the mobile stations and includes base station functionality, a first radio manager and mobile station functionality all co-located with said base station functionality,
the base station functionality having a physical back-connection to the first radio manager, the first radio manager having a physical connection with said mobile station functionality, the mobile station functionality communicating via antennae with at least one selectable static base station,
wherein said first radio manager comprises a radio resource manager; and functionality for receiving information from, and sending information to, other radio managers, respectively co-located with other moving base stations; and
using said information to determine whether to reject at least one mobile station seeking to be served by an individual base station associated with said first radio manager
wherein the information used to determine whether to reject includes at least one of the following:
location of said at least one moving base station; and statistics regarding measurements of link quality
wherein said information received from other radio managers and used to determine whether to reject comprises information regarding qualities of respective connections of respectively co-located radio managers back to the core network,
wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information, and
wherein said parameter characterizing route quality is a combination of measured qualities of route sections and fluctuations thereof such that route sections with larger fluctuating quality measurements are devalued due to their unpredictability relative to route sections with smaller fluctuating quality measurements.

30. The method according to claim 29 wherein said information includes information regarding qualities of other base stations' respective connections back to the core network.

31. The method according to claim 29 wherein said information includes information regarding quality of the first radio manager's moving base station's connection back to the core network.

32. The method according to claim 29 wherein said information includes information regarding channel qualities which said first radio manager's own base station, and base stations other than said first radio manager's own base station, are respectively able to provide, to mobile stations in the vicinity of the first radio manager.

33. A computer program product, comprising a non-transitory tangible computer readable medium having computer readable program code embodied therein, said computer readable program code adapted to be executed to implement a mobile communication networking method, the method comprising:
providing a core network including a core device and at least one static base station; a plurality of base stations; and a population of mobile stations communicating via antennae with the base stations;
the base stations including at least one moving base station which communicates via antennae with the mobile stations and includes base station functionality, a first radio manager and mobile station functionality all co-located with said base station functionality,
the base station functionality having a physical back-connection to the first radio manager, the first radio manager having a physical connection with said mobile station functionality, the mobile station functionality communicating via antennae with at least one selectable static base station,
wherein said first radio manager comprises a radio resource manager; and functionality for receiving information from, and sending information to, other radio managers, respectively co-located with other moving base stations; and
using said information to determine whether to reject at least one mobile station seeking to be served by an individual base station associated with said first radio manager
wherein the information used to determine whether to reject includes at least one of the following:
location of said at least one moving base station; and statistics regarding measurements of link quality
wherein said information received from other radio managers and used to determine whether to reject comprises information regarding qualities of respective connections of respectively co-located radio managers back to the core network,
wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information, and wherein said parameter characterizing route quality is a combination of measured qualities of route sections and fluctuations thereof such that route sections with larger fluctuating quality measurements are devalued due to their unpredictability relative to route sections with smaller fluctuating quality measurements.

34. The product according to claim 33 wherein said mobile station seeking to be served by said individual base station includes a mobile station currently being served by said individual base station.

35. The product according to claim 33 wherein said individual base station is co-located with the individual co-located radio manager.

36. The product according to claim 33 wherein said individual base station is served by the individual co-located radio manager.

37. The product according to claim 33 wherein said functionality is also operative to determine a base station other than said individual base station, which is more suitable than said individual base station to serve said mobile station seeking to be served.

38. The product according to claim 33 wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information.

39. The product according to claim 33 and also comprising a core device and wherein the core device allocates constant communication session bandwidth between each mobile station functionality and the base station with which it is communicating so as to maintain a constant active mode of communication between each mobile station functionality and the base station.

40. The product according to claim 33 wherein said functionality is operative for detecting the quality of each end-user section and the quality of each backhauling section according to mobile stations' and mobile station functionalities' measurements and for combining said qualities into quality grade results for a current route and for alternative routes for at least one mobile station.

41. The product according to claim 40 and wherein said quality grade results are broadcast to at least one mobile stations.

42. The product according to claim 40 wherein at least one handover decision, to hand over a node from one base station to another, is made by taking into account, for at least one alternative route, the quality grade result of access and backhauling sections.

43. The product according to claim 40 wherein at least one cell admission decision is made by taking into account, for at least one alternative route, the quality grade result of access and backhauling sections.

44. The product according to claim 40 wherein at least one cell reselection decision is made by taking into account, for at least one alternative route, the quality grade result of access and backhauling sections.

45. The product according to claim 40 wherein said mobile stations' and mobile station functionalities' measurements include Reference symbol received power (RSRP).

46. The product according to claim 40 wherein said mobile stations' and mobile station functionalities' measurements include Received Signal Strength Indicator.

47. The product according to claim 40 wherein said mobile stations' and mobile station functionalities' measurements include Reference Signal Received Quality.

48. The product according to claim 40 wherein the Quality Grade Result (QGR) of all alternative routes is distributed to mobile stations using a broadcast message.

49. The product according to claim 48 wherein the broadcast message relating to each individual base station is sent to all mobile stations camping on said individual base station.

50. The product according to claim 33 wherein each radio manager uses measurements from at least one other radio manager over a sub-network, and at least one of Reference symbol received power (RSRP), Received Signal Strength Indicator and Reference Signal Received Quality measurements from at least one of its co-located mobile station functionality and a mobile station, to build a radio resource measurements table.

51. The product according to claim 50 wherein at least one of said measurements is distributed by broadcast message type to all radio managers.

52. The product according to claim 33 wherein said information is transmitted between radio managers via radio.

53. The product according to claim 33 wherein at least one radio manager is operative to masquerade as a base station by sending a request to a mobile station functionality to execute an NMR (Network Measurement Report) measurement.

54. The product according to claim 33 wherein said information includes information regarding quality at which the first radio manager's mobile station functionality would be served by each base station capable of serving the first radio manager's mobile station functionality.

* * * * *